United States Patent [19]
Yamamoto et al.

[11] Patent Number: 5,796,957
[45] Date of Patent: Aug. 18, 1998

[54] NETWORK SYSTEM AND TERMINAL APPARATUS

[75] Inventors: Mitsuru Yamamoto, Yokohama; Hiroshi Mashimo, Kawasaki, both of Japan

[73] Assignee: Canon Kabushiki Kaisha, Tokyo, Japan

[21] Appl. No.: 927,799

[22] Filed: Sep. 11, 1997

Related U.S. Application Data

[63] Continuation of Ser. No. 122,340, Sep. 17, 1993, abandoned.

[30] Foreign Application Priority Data

Sep. 21, 1992 [JP] Japan .................................. 4-250864
Jun. 30, 1993 [JP] Japan .................................. 5-162462

[51] Int. Cl.⁶ .............................. G06F 13/00; H04L 11/00
[52] U.S. Cl. ............................ 395/200.81; 395/200.66; 395/200.77
[58] Field of Search .......................... 395/200, 200.34, 395/200.6, 200.66, 200.77, 200.81; 379/53; 358/85, 136, 257; 370/477, 521

[56] References Cited

U.S. PATENT DOCUMENTS

| | | | |
|---|---|---|---|
| 4,688,108 | 8/1987 | Cotton et al. | 358/257 |
| 4,935,953 | 6/1990 | Appel et al. | 379/53 |
| 4,949,169 | 8/1990 | Lumelsky et al. | 358/86 |
| 5,014,267 | 5/1991 | Tompkins et al. | 370/62 |
| 5,119,373 | 6/1992 | Fredricsson et al. | 370/85.6 |
| 5,210,605 | 5/1993 | Zaccarin et al. | 358/105 |
| 5,220,325 | 6/1993 | Ackland et al. | 341/67 |
| 5,375,068 | 12/1994 | Palmer et al. | 364/514 |

FOREIGN PATENT DOCUMENTS 9112677  8/1991  WIPO.

OTHER PUBLICATIONS

Ross "An overview of FDDI: The fiber distributed data interface"; IEEE Journal on Selected Areas in Communications, vol. 7, No. 7, Sep. 1989, pp. 1043–1051.

Tangemann et al. "Performance analysis of the timed token protocol of FDDI and FDDI-II"; IEEE Journal on Selected Areas in Communications, vol. 9, No. 2, Feb. 1991, pp. 271–278.

*Primary Examiner*—Mark H. Rinehart
*Attorney, Agent, or Firm*—Fitzpatrick, Cella, Harper & Scinto

[57] ABSTRACT

A moving image network system which has high response to a moving image transmission request and prevents interruption of a moving image signal. Upon transmitting moving image data from terminal 1 to terminal 2, controller 20 adds a transmitter terminal address, priority and a coding type of the moving image data to transmission load information received by transmission load information receiver 17, and outputs the data to transmission load information transmitter 16. The controller 20 encodes/decodes moving image data in accordance with transmission load information of the moving image data and adjusts transmission data amount corresponding to transmission load of a transmission path.

15 Claims, 17 Drawing Sheets

FIG. 20A

| FOR TERMINAL 101 | FOR TERMINAL 102 | FOR TERMINAL 103 | FOR TERMINAL 104 | FOR TERMINAL 105 |
|---|---|---|---|---|

FIG. 20B

| SLOT 1 | SLOT 2 | SLOT 3 | SLOT 4 | SLOT 5 | SLOT 6 | SLOT 7 | SLOT 8 |
|---|---|---|---|---|---|---|---|

FIG. 20C

| EMPTY SLOT OR USED SLOT | TRANSMITTER TERMINAL ADDRESS | PRIORITY | CODING TYPE |
|---|---|---|---|

NETWORK SYSTEM AND TERMINAL APPARATUS

This application is a continuation of application Ser. No. 08/122,340, filed Sep. 17, 1993, now abandoned.

BACKGROUND OF THE INVENTION

1. [Field of the Invention]

Present invention relates to an information network system and terminal apparatus and, more particularly, to an information network system connected to a plurality of terminals such as multimedia, a work station, a personal computer and a printer.

2. [Related Art]

Conventionally, an information network system has been constructed as shown in FIG. 17.

In FIG. 17, reference numeral 49 denotes a transmission path such is a coaxial cable. Numerals 50 to 54 denote terminals connected to the transmission path 49. FIG. 17 shows only the construction of the terminal 52, however, the other terminals have the same construction.

In the terminal, numeral 61 denotes a data processor for generating transmission data and processing received data; 60, an output unit for transferring the transmission data generated by the data processor 61 to transmitter 56, which outputs the input data from the output unit 60 to the transmission path 49; 55, a receiver for receiving data from the transmission path 49; 59, an input unit for transferring the data received by the receiver 55 to the data processor 61; 57, a collision detector for detecting a collision with another terminal and outputting a detection result to the data processor 61; and 58, a carrier detector for detecting transmission from another terminal and outputting a detection result to the data processor 61.

In the conventional information network system having the above construction, a terminal which is going to perform data transmission confirms unused status of the transmission path 49 by the carrier detector 58, and transfers transmission data generated by the data processor 61 to the transmitter 56 via the output unit 60. The transmitter 56 converts the data into a predetermined signal and outputs the signal onto the transmission path 49.

If the collision detector 57 detects a collision, the terminal transmits a predetermined jam signal from the transmitter 56 and stands by in accordance with a predetermined back off algorithm, thereafter, retries transmission again. If no collision occurs, it transmits the transmission data.

In the above conventional information network system, the receiver 55 of all the terminals always monitors data on the transmission path 49, and in a case where a reception address added to the data on the transmission path 49 corresponds to the address of its own terminal, receives the data and transfers it to the input unit 59.

However, the conventional system has following problems.

In the conventional system, the right of use of the transmission path 49 is assigned to a terminal which has started transmission earlier than other terminals in a "first come, first served" manner regardless of priority or emergency. Accordingly, the other terminals have to wait for the termination of transmission of the terminal that has obtained the use of the transmission path 49.

Further, in the conventional system, the transmission path 49 has not been efficiently used since data outputted onto the transmission path 49 is transmitted through the whole transmission path 49, and at this time, the transmission path 49 is used for only one transmission. For example, in FIG. 18, when the terminal 50 transmits data to the terminal 52, the data from the terminal 50 is also transmitted to the terminals 54 and 56 which are not the receiver terminals of the transmission. In this case, as a result, the terminals 54 and 50 cannot perform transmission.

As a moving image network system, an optical ring network having a structure as shown in FIG. 19 is considered. This network comprises video camera 65 as a moving image signal source, display 66 as a moving image output device and terminal 67 connected to the video camera 65 and the display 66. The terminal 67 has a function of encoding a moving image signal from the video camera 65 into a desired digital signal and outputting the signal to network interface 68 and a function of decoding a digital signal from the network interface 68 and inputting the decoded signal into the moving image output device.

The network interface 68 has a function of examining slots of a frame which circulates on the optical ring network and inserting a digital signal outputted from the terminal into an empty channel and a function of reading out a digital signal from a channel for the terminal. Optical fiber 69 is employed as a transmission path for an optical signal transmitted on the optical ring network.

However, the above optical ring network has a drawback that, as one channel is monopolistically assigned to the plural slots for one moving image signal transmission, a terminal which newly transmits a moving image transmission request when all the slots are used has to wait until one of the slots becomes empty, thus degrading response to transmission request.

To solve the above problem, sequentially changing the channel use in a predetermined time unit can be considered to realize transmission of moving image signals more than the number of the channels. In this case, however, the transmission of a moving image signal is halted at any time when the right of use of channel is lost.

Further, in the above optical ring network, transmission capacity of one channel is fixed. For this reason, if a transmission moving image is a lower resolution image or a transmission data amount is small, a part of the transmission capacity is wasted, thus degrading the usage efficiency of the transmission path in the entire network.

To solve this problem, the present applicant has proposed U.S. patent application Ser. No. 07/924,629 filed on Aug. 4, 1992 prior to the present invention.

SUMMARY OF THE INVENTION

The present invention has been made in consideration of the aforementioned problems and drawbacks of the conventional systems, and has as its object to provide a network system and terminal apparatus which has high usage efficiency of a transmission path.

Another object of the present invention is to provide a network system and terminal apparatus which transmits transmission data without delay.

Further, another object of the present invention is to provide a terminal apparatus for a network system having high usage efficiency of a transmission path.

According to the present invention, the foregoing objects are attained by providing an information network system comprising: a plurality of terminals; and a plurality of transmission media forming a transmission path by connecting the plurality of terminals, wherein the plurality of terminals respectively have: a memory for relaying transmission information; and transmission means for transmitting the transmission information in accordance with priority order, wherein said system transmits the transmission information on the transmission path formed by the transmission media in a predetermined direction.

It is another object of the present invention to provide a network system and terminal apparatus for a moving image.

Further object of the present invention is to provide a network system and terminal apparatus which has high response to moving image transmission request.

It is another object of the present invention to provide a network system and terminal apparatus which transmits properly compressed moving image data corresponding to the status of a transmission path.

According to the present invention, the foregoing objects are attained by providing a moving image network system, in which a plurality of terminals are connected to each other via a bi-directional transmission path, for inserting moving image data into a plurality of slots and transmitting/receiving the moving image data, comprising: means for generating transmission load information regarding transmission of the moving image data on the transmission path; means for transmitting/receiving the transmission load information in a direction opposite to a transmission direction of the moving image data; coding means for encoding the moving image data based on a predetermined coding method in accordance with the transmission load information; and decoding means for decoding the moving image data based on a predetermined decoding method.

It is another object of the present invention to provide a network system and terminal apparatus having a novel structure or function.

Further object of the present invention is to provide a network system and terminal apparatus for encoding a plurality of moving images by compression rate variable coding and transmitting the coded images.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 20A to 20C illustrate a transmission load information format.

DETAILED DESCRIPTION OF THE PREFERRED EMBODIMENTS

The information network system as preferred embodiments of the present invention will be described in detail in accordance with the accompanying drawings.

[First Embodiment]

Figure 1:
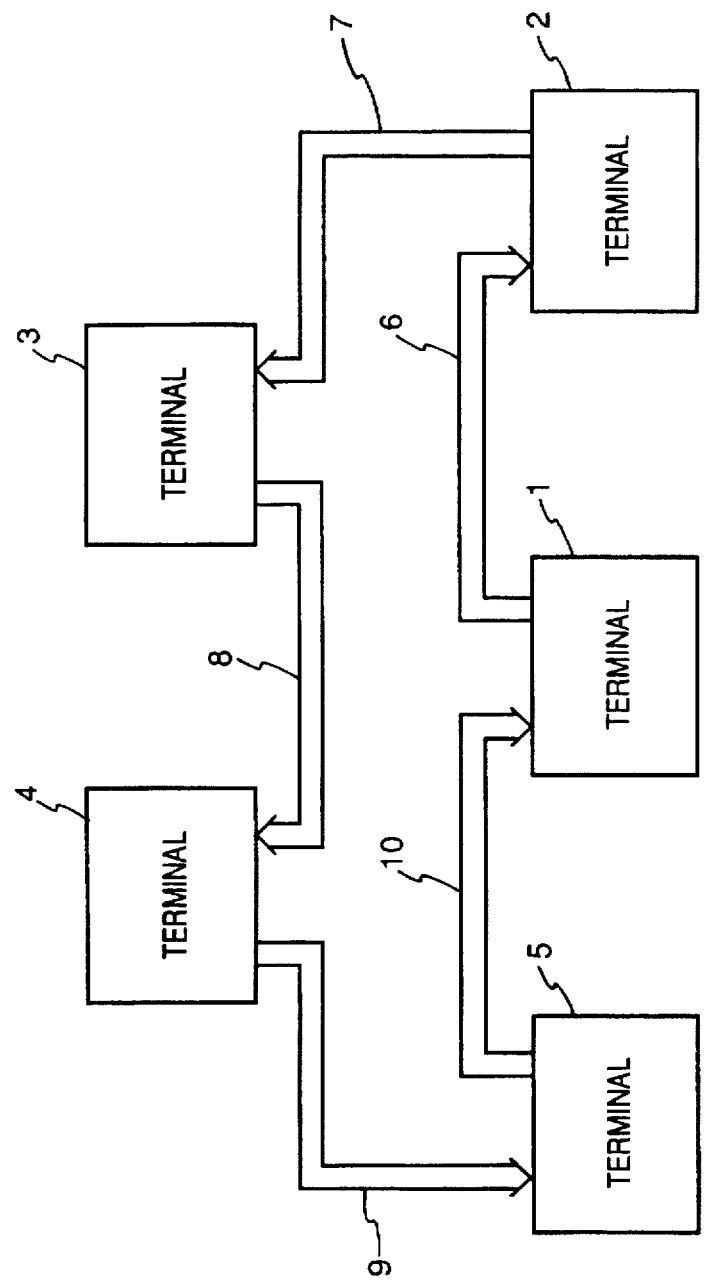
FIG. 1 is a block diagram showing the configuration of a first embodiment of the present invention.

FIG. 1 is a block diagram showing the configuration of an information network system of the present embodiment. The network system comprises five terminals.

In FIG. 1, reference numerals 6 to 10 denote transmission paths comprising a coaxial cable or an optical fiber for connecting the terminals. It should be noted that the transmission path 49 in the conventional network is connected to all the terminals, while in this embodiment, the transmission paths 6 to 10 respectively connect adjoining two terminals.

Numerals 1 to 5 denote terminals connected to each other by the transmission paths so as to form a ring shape. In this embodiment, data flows, e.g., from the terminal 1 to the terminal 2, from the terminal 2 to the terminal 3, . . . , from the terminal 5 to the terminal 1. If the terminal 1 transmits data to the terminal 4, the terminal 1 transmits the data via the terminals 2 and 3.

As the respective terminals have substantially the same construction, the construction of the terminal 1 will be described below with reference to FIG. 2.

Figure 2:
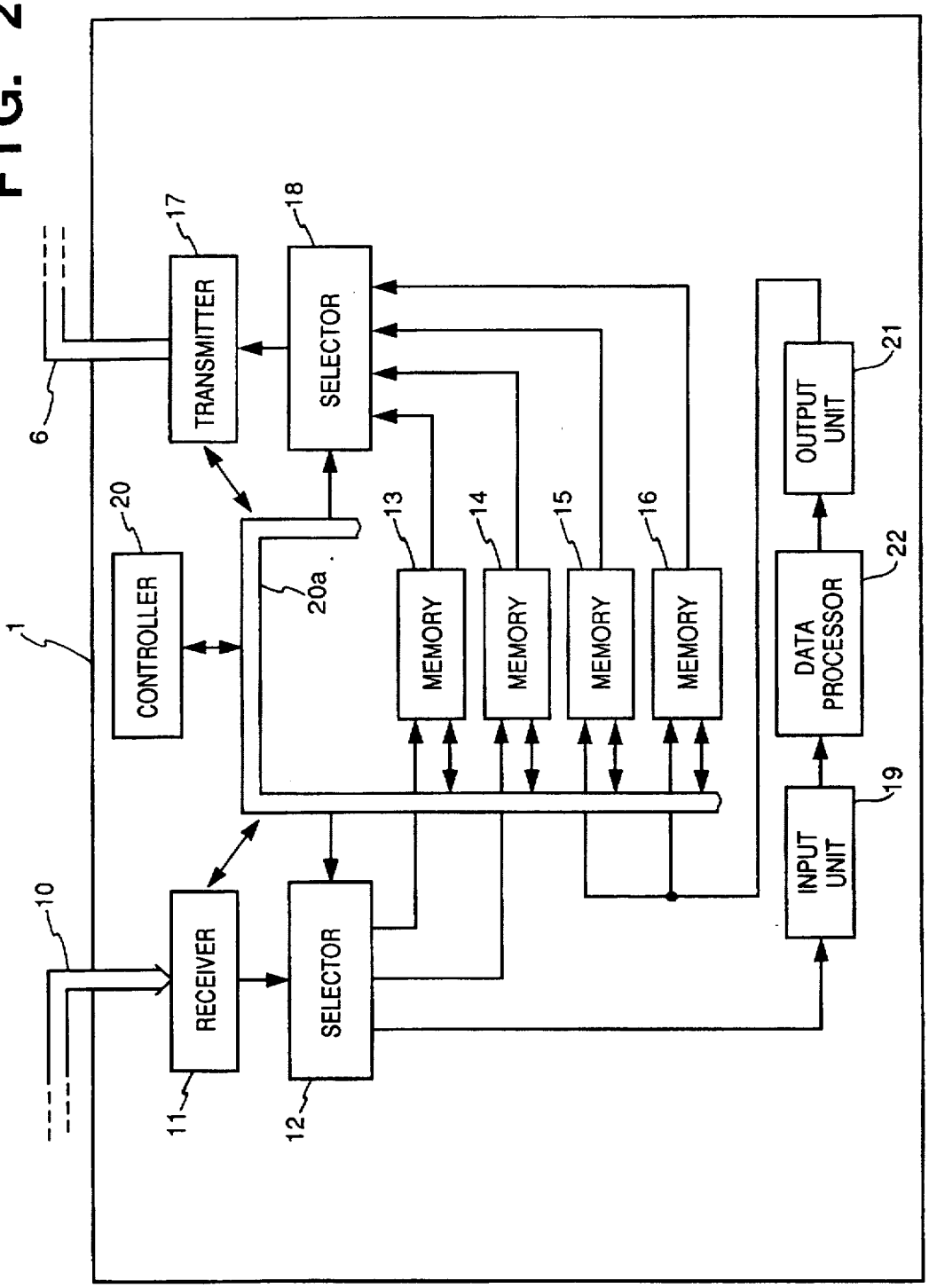
FIG. 2 is a block diagram showing the construction of a terminal of the embodiment.

In FIG. 2, reference numeral 20 denotes a controller for controlling other devices via control bus 20a, storing received data into a predetermined internal memory in accordance with information including a reception address added to the head of the received data and priority information indicative of higher-priority or lower-priority (hereinafter these informations will be referred to as "header information"), and sequentially transmitting data stored in a plurality of memories in accordance with priority order.

Numeral 11 denotes a receiver for receiving data from the transmission path 10. In a case where the transmission path comprises an optical fiber, the receiver 11 has a converter for converting an optical signal from the transmission path 10 into an electric signal.

Numeral 12 denotes a selector for outputting the received data outputted from the receiver 11 to memories 13 or 14 or input unit 19 under the control of the controller 20.

From the received data, higher priority data for another terminal is stored into the memory 13, while lower priority data for another terminal is stored into the memory 14. These memories comprise a FIFO (first-in-first-out) memory. The input unit 19 transfers the received data inputted from the selector 12 to data processor 22 for generating data and processing received data.

Numeral 21 denotes an output unit for outputting transmission data to which header information is added to the data generated by the data processor 22. The output unit 21 outputs the transmission data and transfers priority information of the data to the controller 20.

Numeral 15 denotes a memory for storing higher priority data from the transmission data under the control of the controller 20. Numeral 16 denotes a memory for storing lower priority data from the transmission data under the control of the controller 20. Similarly to the memories 13 and 14, these memories comprise a FIFO memory.

Numeral 18 denotes a selector for receiving data from any of the four memories 13 to 16 and outputting the input data to transmitter 17 under the control of the controller 20.

The transmitter 17 transmits the data inputted from the selector 18 to the transmission path 6. In a case where the transmission path comprises an optical fiber, the transmitter 17 has a converter for converting an electric signal into an optical signal and transmitting the signal onto the transmission path 6.

Next, the operation of the present embodiment will be described in detail below.

In FIG. 1, when the terminal 1 receives data transmitted from the terminal 5, the controller 20 in the terminal 1 examines the header information of the received data.

If the reception address of the received data corresponds to the address of the terminal 1, the controller 20 sets an output destination of the selector 12 to the input unit 19 and transfers the received data to the data processor 22 via the input unit 19. On the other hand, if the reception address of the received data does not correspond to the address of the terminal 1, the controller 20 writes the received data into the memory 13 or the memory 14 in accordance with the priority information of the data.

Upon transmission, the data processor 22 generates transmission data, adds header information to the transmission data, and outputs the data to the output unit 21. The output unit 21 writes the transmission data into the memory 15 or the memory 16 in accordance with the priority information of the data.

The controller 20 examines presence/absence of data stored in the memories 13 to 16. If data exists in any of the memories, the controller 20 transmits the data by the transmitter 17 in a predetermined order, e.g., the memory 13, the memory 14, the memory 15 and the memory 16.

More specifically, if data exists in the memory 13, the controller 20 controls the selector 18 to read the data out of the memory 13 and input the data into the transmitter 17.

If data exists in the memory 14, the controller 20 controls the selector 18 to read the data out of the memory 14 and input the data into the transmitter 17.

If received data is newly written into the memory 13 during transmission of the data stored in the memory 14 (when data having priority higher than that of data currently being transmitted is received), the controller 20 transmits the data stored in the memory 13 immediately after the transmission of the current transmission. That is, the controller 20 performs the transmission of the data in the memory 13 prior to transmission of data stored in the memories 15 and 16.

If the transmission of the data stored in the memory 14 is over and there is no data in the memory 13, the controller 20 transmits data stored in the memory 15. Further, if the transmission of the data in the memory 15 is over and there is no data in the memory 13 or the memory 14, the controller 20 transmits data stored in the memory 16.

In the present embodiment, if transmission of data stored in the memories 13 to 16 is over and the memories become empty, the terminal comes into transmission waiting status.

In the above description and figures, the information network system comprises five terminals, however, the present embodiment is not limited to this number of terminals. The network system can comprise an arbitrary number of terminals.

In the above description, the memories 13 to 16 are FIFO's, however, the present embodiment is not limited to this arrangement. For example, the system can employ normal memories with a data management table managed by the controller 20. In the data management table, a series of reception data numbers indicative of data reception order, address information indicative of a memory in which data corresponding to the number is stored, a series of transmission data numbers indicative of data transmission order, and address information indicative of a memory in which transmission data corresponding to the number is stored are recorded. The controller 20 deletes a data number and address information in accordance with completion of data transmission.

As described above, according to the present embodiment, connecting terminals with transmission paths to transmit data with header information such as information indicative of a reception address and priority in one direction realizes an information network system having high usage efficiency of transmission paths, all of which are not occupied with only one transmission. Further, according to the embodiment, a plurality of data transmitted onto the transmission paths are arranged in priority order at a terminal previous to the destination terminals and relayed to their respective destinations. Each destination terminal receives corresponding data, as a result, the data amount on the transmission path is reduced, thus quickly transmitting higher-priority data.

[Second Embodiment]

Figure 3:
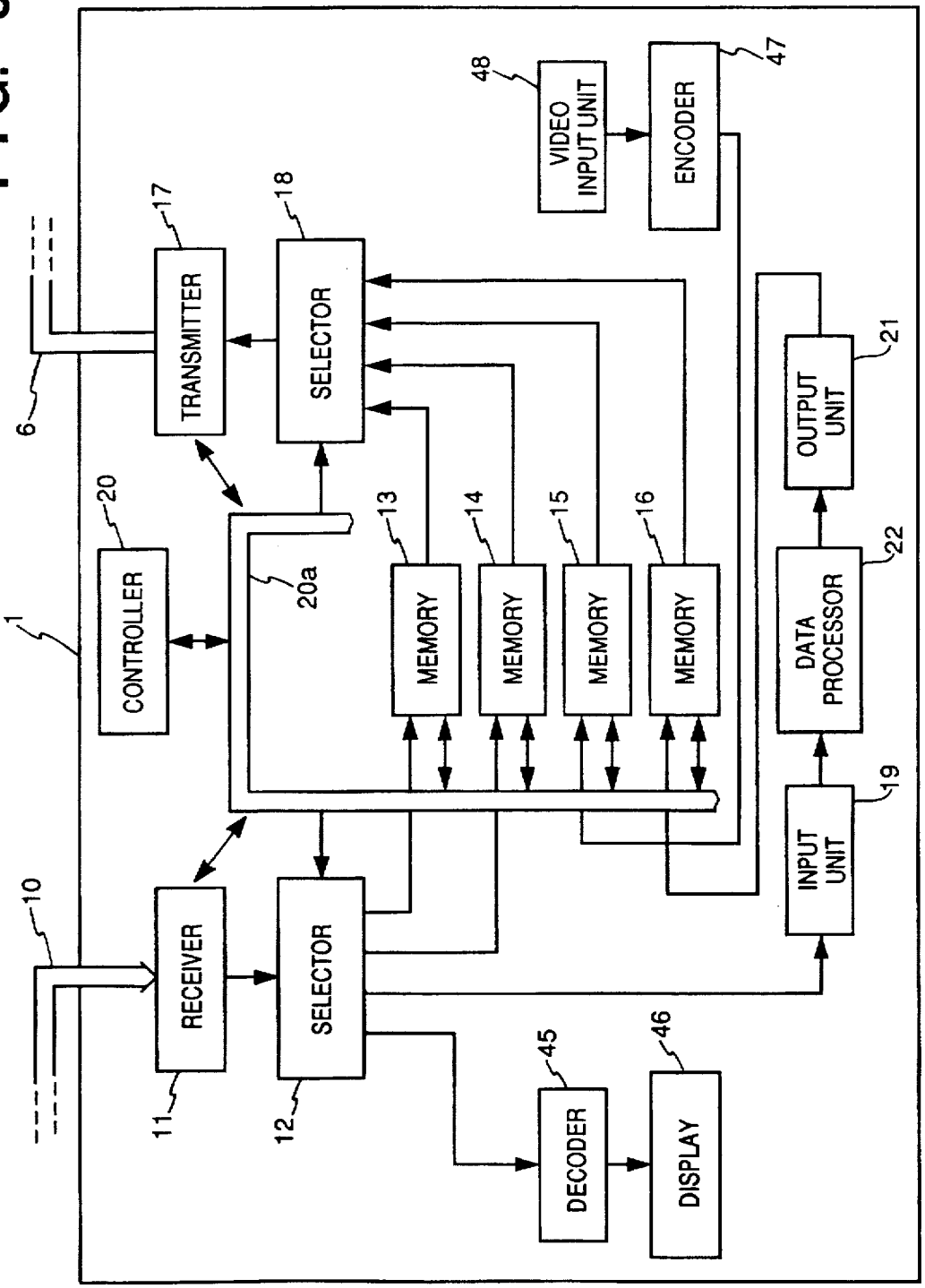
FIG. 3 is a block diagram showing the construction of a terminal according to a second embodiment of the present invention.

Next, an information network system according to the second embodiment of the present invention will be described in detail with reference to FIG. 3. In FIG. 3, components corresponding to those in the first embodiment have the same reference numerals, and the explanations of these components will be omitted.

The second embodiment describes an information network system comprising five terminals 1 to 5, connected to each other in the same manner as the first embodiment, for dealing with moving image data and code data. In this embodiment, the priority of moving image data is higher and that of code data is lower. The moving image data priority is set to "1", and the code data priority is set to "2".

FIG. 3 is a block diagram showing the construction of the terminal 1 of the present embodiment.

In FIG. 3, received data enters the selector 12. If the received data is moving image data for another terminal, the selector 12 outputs the data to the memory 13; if the data is code data for another terminal, the selector 12 outputs the data to the memory 14; if the received data is moving image data for the terminal 1, the selector 12 outputs the data to decoder 45; if the received data is code data for the terminal 1, the selector 12 outputs the data to the input unit 19. The selector 12 outputs the received data under the control of the controller 20.

The decoder 45 removes header information of the received data and decodes the received data to convert it into a predetermined video signal.

Numeral 46 denotes a display for displaying an image represented by the video signal inputted from the decoder 45; 48, a video input unit in which a video signal is inputted from, e.g., a video camera and VTR (video tape recorder); 47, an encoder for encoding the video signal inputted from the video input unit 48 in frame units, adding header information to the coded data to convert the data into transmission moving image data.

In the present embodiment, the moving image data outputted from the encoder 47 is stored into the memory 15. Code data which has been generated by the data processor 22 is stored via the output unit 21 into the memory 16.

Next, the operation of the present embodiment will be described in detail below.

When the terminal 1 receives data transmitted from the terminal 5, similarly to the pervious embodiment, the controller 20 of the terminal 1 examines the header information of the received data.

If the reception address of the received data coincides with the address of the terminal 1 and the priority information of the received data is "1", the controller 20 sets the output destination of the received data to the decoder 45 ; if the priority information is "2", the controller 20 sets the output destination to the input unit 19. On the other hand, if the reception address of the received data does not coincides with the address of the terminal 1 and the priority information is "1", the controller 20 sets the output destination to the memory 13; if the priority information is "2", sets the output destination to the memory 14.

The controller 20 examines presence/absence of data stored in the memories 13 to 16. If data exists in any of these memories, the controller 20 transmits the data by the transmitter 17 in accordance with a predetermined order, e.g., the memory 13, the memory 14, the memory 15 and the memory 16.

The controller 20 performs transmission of moving image data stored in the memory 13 or the memory 15 in frame units. Note that as reading bit rate in the memory 15 is much higher than encoding bit rate in the encoder 47, data time-axis compression is made, and transmission can be performed such that a frame of another moving image or code data is inserted between frames of the transmission moving image.

In the present embodiment, image data is not limited to moving image data, still-image data can also be treated.

As described above, the present embodiment has an advantage substantially similar to that of the first embodiment. Further, in this embodiment, the transmission paths can be used more efficiently, for moving image data of large data amount is transmitted in preference to other data of smaller data amount, in addition, another moving image frame or code data can be inserted between the transmission moving image data frames.

As described above, the first and second embodiments provide an information network system for transmitting information in a predetermined direction on a transmission path formed by connecting a plurality of terminals with a plurality of transmission media, and a terminal apparatus which stores at least one part of received information and transmission information formed by the apparatus in accordance with information type, and transmits the stored information in accordance with priority order.

[Third Embodiment]

Figure 4:
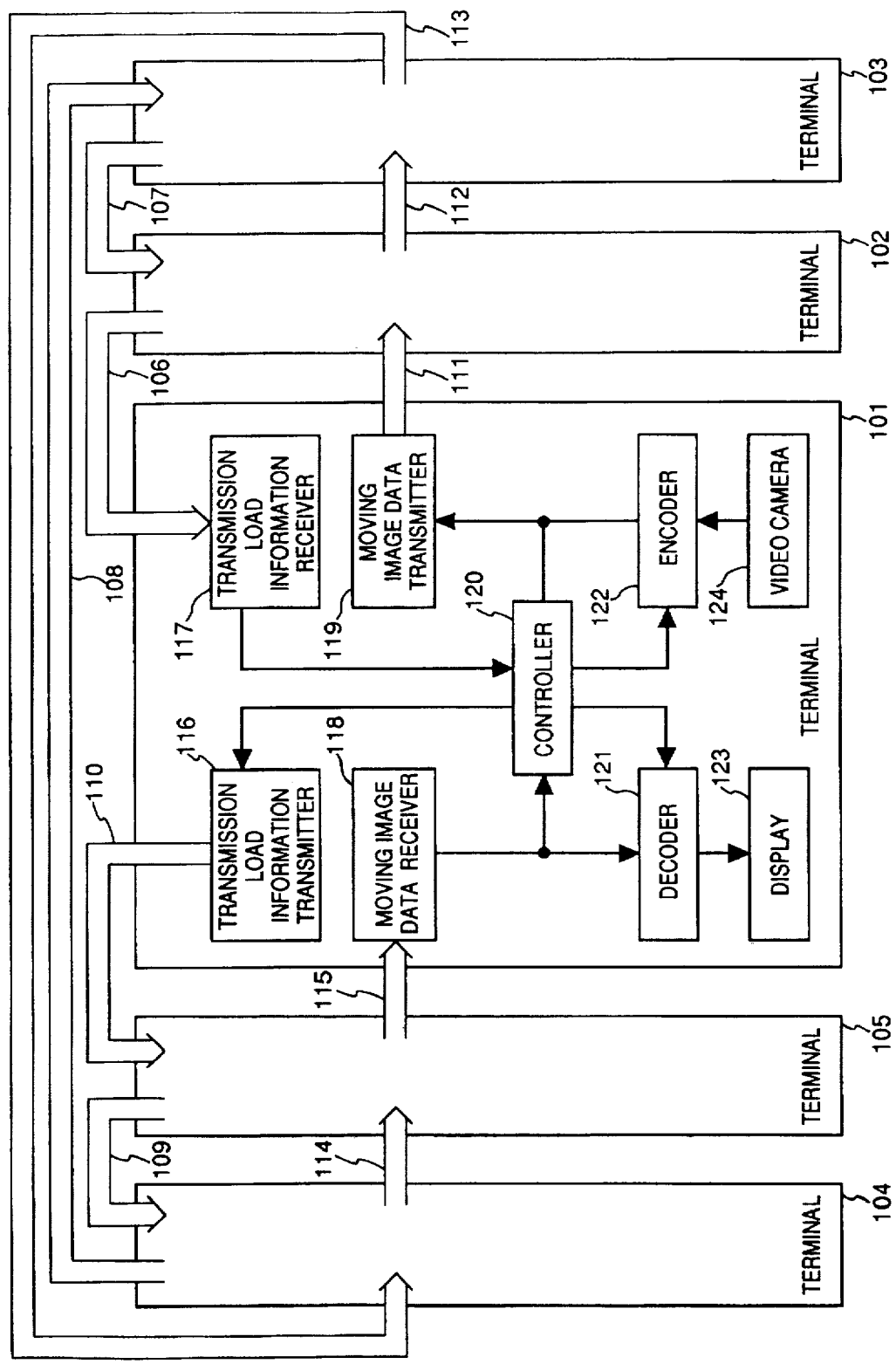
FIG. 4 is a block diagram showing the configuration of a moving image network system according to a third embodiment of the present invention.

FIG. 4 is a block diagram showing the configuration of a moving image network system according to the third embodiment of the present invention. In FIG. 4, the moving image network system comprises five terminals 101 to 105. As these terminals have the same construction, FIG. 4 shows only the construction of the terminal 101.

Numerals 106 to 115 denote transmission paths comprising a coaxial cable for connecting the terminals. Among these transmission paths, the transmission paths 111 to 115 are employed for transmitting moving image data, and the transmission paths 106 to 110 are employed for transmitting data other than moving image data.

Numeral 116 denotes a transmission load information transmitter for transmitting information of transmission load, which is for transmitting moving image data from the terminal 101 to the terminal 102, to the terminal 105. The description of the transmission load information will be given later. Numeral 117 denotes a transmission load information receiver for receiving transmission load information transmitted from the terminal 102. Numeral 118 denotes a moving image data receiver for receiving moving image data transmitted via the transmission path 115.

Figure 10:
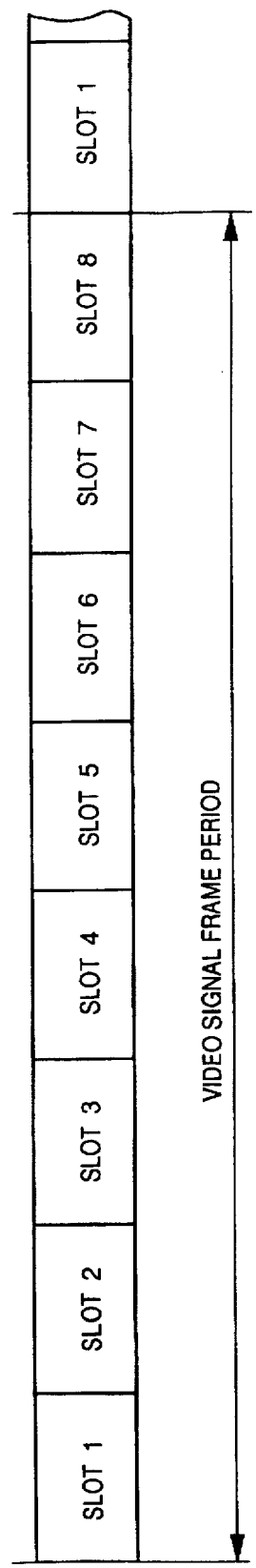
FIG. 10 illustrates an example of eight slots divided from a video signal frame period by moving image data transmitter 119.

Numeral 119 denotes a moving image data transmitter. As shown in FIG. 10, the moving image data transmitter 119 divides a video signal frame period into eight slots, inserts moving image data, to which header information to be described later is added, into the respective slots, and transmits the signal onto the transmission path 111. Numeral 120 denotes a controller which examines the header information of the moving image data outputted from the moving image data receiver 118 including informations such as an address indicative of a terminal to receive the moving image data, priority and coding type, and if the receiving terminal address corresponds to the address of the terminal 101, the controller 120 controls the decoder 121 to receive the moving image data from the moving image data receiver 118.

On the other hand, if the receiver terminal address does not coincide with the address of the terminal 101, the controller 120 compares the priority of the received moving image data with that of a moving image signal outputted from the encoder 122, and outputs a higher priority signal to the moving image data transmitter 119. Further, the controller 120 controls the amount of moving image data generated by the encoder 122 in accordance with information from the transmission load information receiver 117.

That is, if the controller 120 receives data indicative of large transmission load from the transmission load information receiver 117, the controller 120 changes the operation of the encoder 122 so as to reduce the moving image data amount. More specifically, the compression rate of the encoder 122 is improved, otherwise, a part of the data outputted from the encoder 122 is deleted.

Furthermore, the controller 120 adds the transmission load information including a transmitter terminal address of the moving image data transmitted from the terminal 101 to the terminal 102, the priority of the data and a coding type, to the transmission load information received by the transmission load information receiver 117, and outputs the data to the transmission load information transmitter 116. As the terminals 101 to 105 respectively perform this addition, the transmission load information includes transmitter terminal addresses, priorities and coding types regarding all the moving image data transmitted between the terminals.

The transmission load information is transmitted in a direction opposite to a moving image data transmission direction. Each transmitter terminal can grasp in advance the transmission load of the terminal between the transmitter and receiver terminals that relays the moving image data to the receiver terminal by examining the transmission load information.

FIG. 20A to 20C illustrate the transmission load information format in the present embodiment. As described above, the transmission direction of the transmission load information is opposite to that of moving image data. In FIG. 4, the transmission load information is transmitted via the transmission path 106 to 110.

FIG. 20A shows frames for the terminals 101 to 105, and the frames have the same construction. The respective terminals write information into a corresponding frame. Each terminal frame have, as FIG. 20B, slot frames 1 to 8 corresponding to the eight slots for the moving image data transmitted via the transmission path 111 to 115 in FIG. 4. Each slot frame includes, as FIG. 20C, information of a corresponding slot: "whether the slot is empty or not"; "transmitter terminal address"; "priority"; and "coding type".

Figure 6:
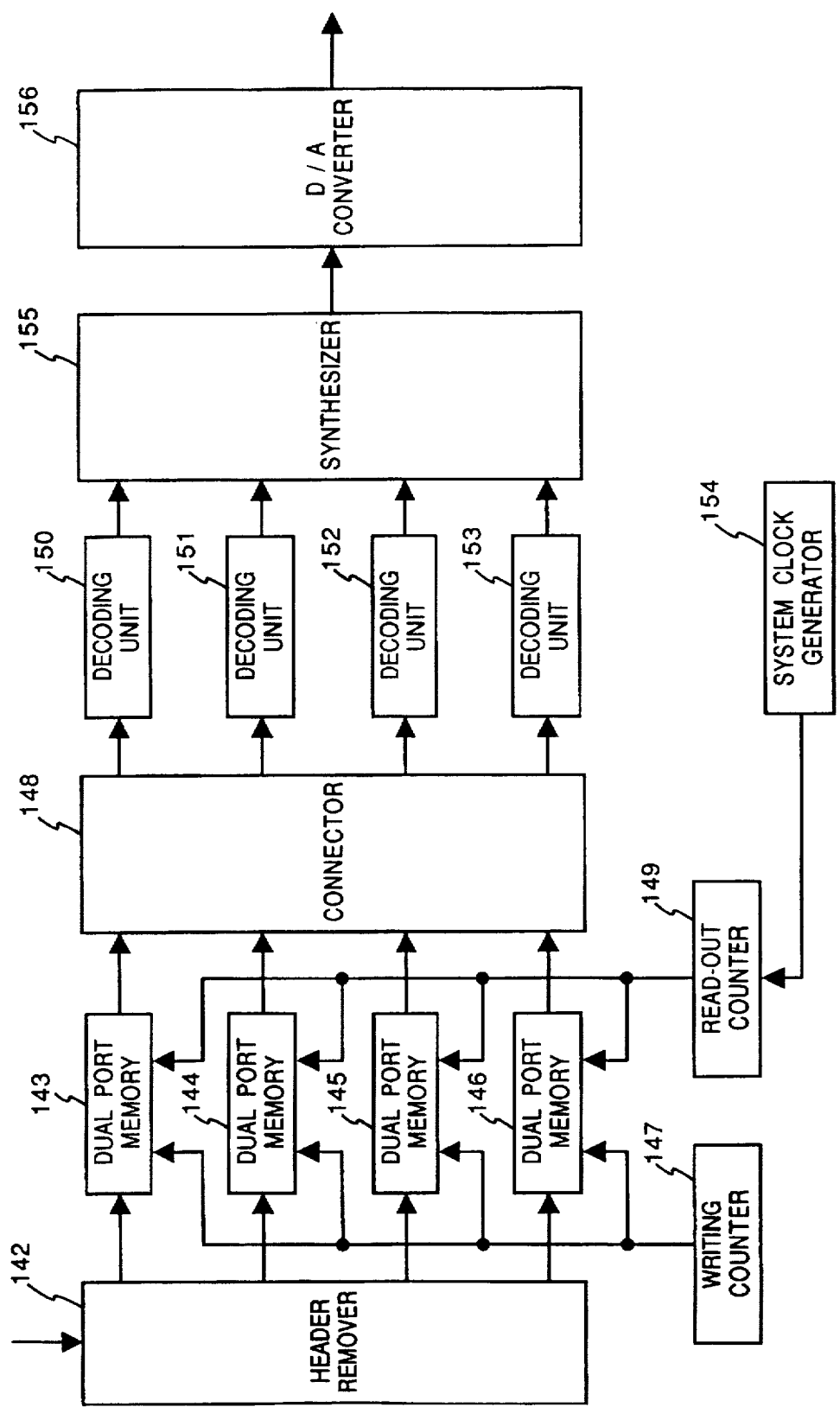
FIG. 6 is a block diagram showing the construction of decoder 121 of the moving image network system in the third embodiment.

In FIG. 4, numeral 121 denotes a decoder for decoding moving image data transmitted to the terminal 101 and outputting the data as a predetermined analog video signal. FIG. 6 shows the construction of the decoder 121.

Numeral 123 denotes a display which functions as a moving image output device, for displaying a moving image by the analog video signal outputted from the decoder 121. Numeral 122 denotes an encoder for converting an analog video signal outputted from video camera 124 as a moving image information source into four partial moving image data as moving image data in accordance with predetermined conversion method to be described later, adding a predetermined header to the respective data, and outputting the data to the moving image data transmitter 119 under the control of the controller 120.

Figure 5:
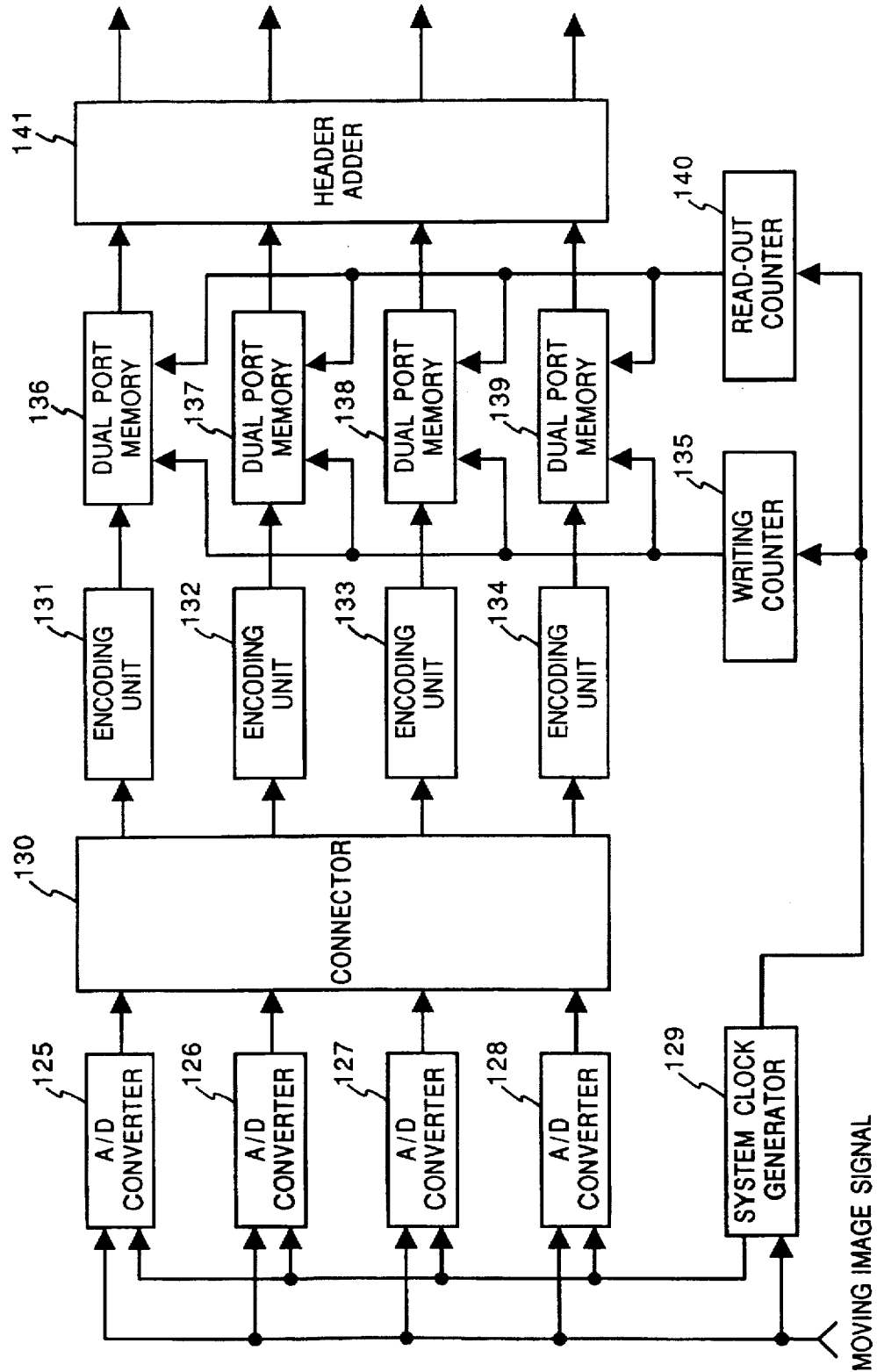
FIG. 5 is a block diagram showing the construction of encoder 122 of the moving image network system in the third embodiment.

FIG. 5 is a block diagram showing in detail an example of the construction of the encoder 122. The encoder 122 may be any encoder so far as it employs variable compression rate coding, e.g., MPEG 1, MPEG 2 and H.261. In FIG. 5, numeral 129 denotes a system clock generator for extracting a synchronous signal from the moving image signal outputted from the video camera 124 and generating sampling signals and various timing signals used within the terminal. Numerals 125 to 128 denote A/D converters for A/D conversion of an input moving image signal based on the sampling signals from the system clock generator 129.

Numeral 130 denotes a connector for inputting the outputs from the A/D converters 125 to 128 into encoding units 131 to 134. The encoding units 131 to 134 encode the outputs from the A/D converters 125 to 128 into four partial moving image data based on predetermined conversion method to be described later.

Numerals 136 to 139 denote dual port memories for respectively storing outputs from the encoding units 131 to 134 in accordance with a writing address outputted from writing counter 135. The writing counter 135 outputs a writing address to the dual port memories 136 to 139 in accordance with the sampling clock outputted from the system clock generator 129.

Numeral 140 denotes a read-out counter for outputting a read-out address to the dual port memories 136 to 139 in accordance with a transmission timing signal outputted from the system clock generator 129. Numeral 141 denotes a header adder for adding header information including a receiver terminal address, a transmitter terminal address, priority and the like to the partial moving image signals read out of the dual port memories 136 to 139.

FIG. 6 is a block diagram showing in detail an example of the construction of the decoder 121. In FIG. 6, numeral 142 denotes a header remover for removing header information added to a partial moving image signal. Numerals 143 to 146 denote dual port memories for reproducing a plurality of partial moving image signals whose headers have been removed. Writing counter 147 generates a writing address for respectively writing the header-removed partial moving image signals into a predetermined area of the dual port memories 143 to 146.

Numeral 149 denotes a read-out counter for generating a read-out address for respectively reading the partial moving image signals out of the dual port memories 143 to 146 based on a timing signal outputted from system clock generator 154. Numeral 148 denotes a connector for inputting the outputs from the dual port memories 143 to 146 into decoding units 150 to 153 for decoding the coded partial moving image signals based on decoding method to be described later.

Numeral 155 denotes a synthesizer for synthesizing the multiple-interleaved moving image signals outputted from the decoding units 150 to 153 into one moving image signal. Numeral 156 denotes a D/A converter for converting the output from the synthesizer 155 into a desired analog video signal and outputting the signal to the display.

Figure 7:
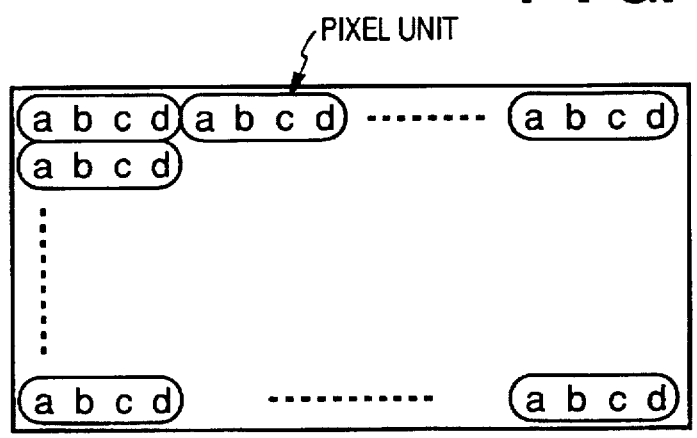
FIG. 7 illustrates an example of the structure of pixel units according to the third embodiment.

In the present embodiment, as shown in FIG. 7, a moving image signal is divided into four pixels "a, b, c and d" aligned in a main-scanning direction, the four-pixel unit is divided into partial moving images based on the following coding conversion method.

Here, a pixel unit having $N_0$ pixels is $P_0$, and an average value of the pixels is $m_{01}$. The pixel unit $P_0$ is divided into two groups $P_1$ and $Q_1$, and average values of pixels of the groups $P_1$ and $Q_1$ are respectively $m_{11}$ and $n_{11}$.

Further, the pixel group $P_1$ is divided into two pixel groups $P_{21}$ and $Q_{21}$, and the pixel group $Q_1$ is divided into two pixel groups $P_{22}$ and $Q_{22}$. Average values of pixels of the groups $P_{21}$ and $Q_{21}$ are respectively $m_{21}$ and $n_{21}$, and average values of pixels of the groups $P_{22}$ and $Q_{22}$ are respectively $m_{22}$ and $n_{22}$.

In this manner, division of pixel unit is continued till the number of pixels belonging to the pixel groups P and Q becomes one and an average value of pixels of each group is obtained, so that a partial moving image signal k is calculated from the No average values m of and the $N_0-1$ average value n of:

$$k_{01} = m_{01}$$
$$k_{11} = m_{11} - m_{01}$$
$$k_{21} = m_{21} - m_{11}$$
$$k_{22} = m_{22} - n_{11}$$
$$k_{31} = m_{31} - m_{21}$$
$$k_{32} = m_{32} - n_{21}$$

-continued $$k_{33} = m_{33} - m_{22}$$
$$k_{34} = m_{34} - m_{22}$$
.
.
.

The coding conversion equations are:

(Encoding unit 131) $k_{01} = \frac{1}{4}(a+b+c+d)$      (1)

(Encoding unit 132) $k_{11} = \frac{1}{2}(a+b) - \frac{1}{4}(a+b+c+d)$      (2)

(Encoding unit 133) $k_{21} = a - \frac{1}{2}(a+b)$      (3)

(Encoding unit 134) $k_{22} = c - \frac{1}{2}(c+d)$      (4)

The decoding conversion equations are:

(Decoding unit 150) $a = k_{01} + k_{11} + k_{21}$      (5)

(Decoding unit 151) $b = k_{01} + k_{11} - k_{21}$      (6)

(Decoding unit 152) $c = k_{01} - k_{11} + k_{22}$      (7)

(Decoding unit 153) $d = k_{01} - k_{11} - k_{22}$      (8)

It should be noted that the above coding scheme has been disclosed in the prior application U.S. Ser. No. 07/924,629 by the present applicant.

Next, the operation of the moving image network system according to the third embodiment will be described below.

In this system, each terminal performs necessary one of the following three operations;

(1) coding: dividing a transmission moving image signal into a predetermined number of partial moving image signals in accordance with the number of empty slots with reference to transmission load information and encoding the partial moving image signals.

(2) transmission: transmitting partial moving image data signal received from a transmission path and moving image data generated by the terminal itself onto the transmission path in accordance with a predetermined procedure with reference to transmission load information, and transmitting information regarding the moving image data currently being transmitted by the terminal itself in a direction opposite to a transmission direction of the moving image data.

(3) decoding: decoding received to the terminal itself partial moving image signals.

These operations will be described in detail below.
<Coding Operation>

If the controller 20 confirms with reference to transmission load information that there are more than four empty slots in each transmission of a corresponding terminal to relay the transmission between the transmitter terminal and the receiver terminal, it instructs the encoder 122 to perform coding using four slots. Thereafter, when a moving image signal enters the encoder 122 from the video camera 124, the system clock generator 129 separates horizontal and vertical synchronous signals from the moving image signal.

Figure 8:
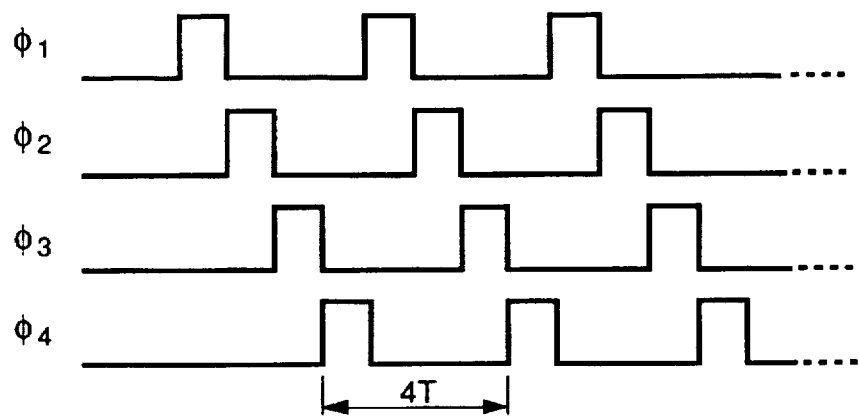
FIG. 8 is a timing chart of sampling signals quadruply interleaved at a period which is a quadruple of a pixel period of an input moving image signal to be used by A/D converters 125, 126, 127 and 128.

FIG. 8 shows sampling signals $\phi_1$ to $\phi_4$ for the A/D converters 125 to 128 quadruply interleaved at period 4T which is a quadruple of pixel period of an input moving image signal. The input moving image is sampled with the pixel unit "a, b, c and d" in FIG. 7 and A/D-converted by the A/D converters 125 to 128. Clock $\phi_0$ latches the A/D converters 125 to 128 so that the converters simultaneously output converted data, and the outputs of the A/D converters enter the encoding units 131 to 134 via the connector 130.

The encoding unit 131 obtains an average value of the outputs from the A/D converters 125 to 128, which are image signals in the a, b, c and d pixel units, by the 4T periods based on the equation (1) and outputs the obtained average value to the dual port memory 136.

The encoding unit 132 obtains a difference value between an average value of the outputs from the A/D converters 125 and 126 and an average value of the outputs from the A/D converters 125 to 128 by the 4T periods based on the equation (2). The encoding unit 132 outputs the obtained difference value to the dual port memory 137.

The encoding unit 133 obtains a difference value between the output from the A/D converter 125 and the average value of the outputs from the A/D converters 125 and 126 by the 4T periods based on the equation (3), and outputs the obtained difference value to the dual port memory 138.

The encoding unit 134 obtains a difference value between the output from the A/D converter 127 and the average value of the outputs from the A/D converters 127 and 128 by the 4T periods based on the equation (4), and outputs the obtained difference value to the dual port memory 139.

The partial moving image signals $k_{01}$, $k_{11}$, $k_{21}$ and $k_{22}$ as the outputs from the encoding units 131 to 134 are inputted into the dual port memories 136 to 139 by the 4T periods and respectively stored into a predetermined position in accordance with a writing address outputted from the writing counter 135.

On the other hand, the read-out counter 140 generates a read-out address at a predetermined transmission timing and sequentially outputs the address to the dual port memories 136 to 139 by the instruction of the controller 120. The reading is first directed to the dual port memory 136. From the dual port memory 136, a partial moving image signal is sequentially read out as a serial signal in accordance with the read-out address and outputted to the header adder 141.

The header adder 141 adds header information including a receiver terminal address, the address of its own terminal as a transmitter terminal (e.g., the terminal 1), coding type "A", and priority "1" to the output from the dual port memory 136 and outputs the data to the moving image data transmitter 119. Similarly, the header adder 141 adds header information including the same receiver and transmitter terminal addresses, coding type "B" and priority "2" to the output from the dual port memory 137 and outputs the data to the moving image,data transmitter 119.

The header adder 141 adds header information including the same terminal addresses, coding type "C" and priority "3" to the output from the dual port memory 138 and outputs the data to the moving image data transmitter 119. The header adder 141 adds header information including the same terminal addresses, coding type "D" and priority "4" to the output from the dual port memory 139 and outputs the data to the moving image data transmitter 119.

If the number of slots designated by the controller 120 is three, the encoding unit 134 becomes inactive and the outputs from the dual port memories 136, 137 and 138 are transferred to the moving image data transmitter 119; if the number of slots is two, the encoding units 133 and 134 become inactive and the outputs from the dual port memories 136 and 137 are transferred to the moving image data transmitter 119; if the number of slots is one, the encoding units 132, 133 and 134 become inactive and the output from the dual port memory 136 is transferred to the moving image data transmitter 119.

<Transmission Operation>

In one terminal, when there is no transmission moving image data, the controller 120 examines header information added to the head of moving image data outputted from the moving image data receiver 118 shown in FIG. 4. If the receiver terminal address in the header information coincides with the address of the terminal, the controller 120 transfers the outputs from the moving image data receiver 118 to the decoder 121. However, if the receiver terminal address does not coincide with the address of the terminal, the controller 120 transfers the output from the moving image data receiver 118 to the moving image data transmitter 119, inserts the data into a predetermined empty slot and transmits the data by the moving image data transmitter 119.

Every time a slot which contains moving image data is transmitted, the controller 120 temporarily records the transmitter terminal address of the moving image data, the coding type and the priority of the data in an internal memory (not shown) of the terminal as transmission load information of its own terminal. If there is no transmission moving image data and empty slots are transmitted, the controller 120 makes a record of the transmission of empty slots.

When the transmission load information receiver 117 newly receives transmission load information, the controller 120 reads out the transmission load information of its own terminal recorded in the above manner, and updates the transmission load information of its own terminal received from the transmission load information receiver 117. More specifically, the controller 120 changes the transmission load information to information regarding moving images transmitted within a predetermined video frame period before current time, i.e., information regarding moving image data transmitted using the eight slots. If empty slots have been transmitted, the controller 120 changes the transmission load information into information indicative of the transmission of empty slots. Then, the controller 120 transmits the updated information from the transmission load information transmitter 116. As described above, FIG. 20 shows the frame format of the transmission load information.

When a terminal transmits moving image data generated in the terminal, the controller 120 of the transmitter terminal examines transmission load information outputted from the transmission load information receiver 117. If transmission load information of all the terminals between the transmitter terminal and the receiver terminal indicates that there are more than four empty slots, the transmission can be made using four slots. The controller 120 instructs the encoder 122 to perform coding using four slots. Similarly, if the number of empty slots is any of three, two and one the controller 120 instructs the encoder 122 to perform coding using any of three, two and one slot, thus raising a compression rate.

If the number of empty slots is zero, the controller 120 examines the transmission load information and determines whether or not there is one or more slots having priority "2" or lower in any of the terminals between the transmitter and receiver terminals. If one slot exists, the controller 120 instructs the encoder 122 to perform coding using one slot. If no slot exists, the transmission is postponed until such slot appears or an available empty slot appears.

When coding instruction is inputted from the controller 120, the encoder 122 performs coding based on the instruction and outputs coded moving image data to the moving image data transmitter 119. If there is an empty slot, the moving image transmitter 119 inserts the moving image data outputted from the encoder 122 into the slot and performs transmission. If there is no empty slot, the moving image data transmitter 119 deletes moving image data of priority "2" or lower outputted from the moving image data receiver 118, inserts the moving image data outputted from the encoder 122 into a slot assigned to the deleted data, and performs transmission.

As transmission load information received to the respective terminals in the above manner, the terminal which has transmitted the deleted data finds the deletion of its transmission data by detecting that the description about the transmission moving image data does not exist in the information of the terminals between the transmitter terminal and the receiver terminal. The transmitter terminal of the deleted data stops an encoder corresponding to the deleted data.

It should be noted that the deletion may not directed to the whole image data. For example, higher-resolution data out of hierarchically-encoded data may be deleted and lower-resolution data may be kept.

In this manner, each transmitter terminal always examines transmission load information after starting of transmission, and when the moving image data transmitted from the transmitter terminal itself is deleted, it stops an encoder corresponding to the deleted moving image data. If any empty slot appears when the transmitter terminal has encoder currently being stopped, it activates the encoder from the highest priority, thus lowering compression rate to transmit more moving image data.

<Decoding Operation>

The header remover 142 in FIG. 6 removes header from partial moving image data inputted to the decoder 121. If coding type recorded in the header is "A", the header remover 142 writes the data into the dual port memory 143 for coding type "A" in accordance with a writing address outputted from the writing counter 147. If the coding type is any of "B", "C" and "D", the header remover 142 writes the data into corresponding one of the dual port memory 144 for coding type "B", the dual port memory 145 for coding type "C", and the dual port memory 146 for coding type "D" in accordance with the writing address from the writing counter 147.

The number of partial moving image data transmitted from a transmitter terminal is controlled by the transmission load information of the terminals between the transmitter and receiver terminals. The receiver terminal changes operation of the decoder 121 based on the number of received partial moving image signals.

The controller 120 counts the number of partial moving image data signals arrived at the decoder 121 at frame period of an image to be outputted to the display 123. If the number is four, it controls the read-out counter so that the data stored in the dual port memories 143 to 146 can be read out. The system clock generator 154 outputs system signals $\phi_1$ to $\phi_4$ quadruply interleaved by the 4T periods.

The read-out counter 149 counts the system signals outputted from the system clock generator 154 and outputs read-out addresses to the dual port memories 143 to 146 by the 4T periods to perform reading out of the stored data. The outputs from the dual port memories 143 to 146 enter the decoding units 150 to 153 via the connector 148.

The decoding unit 150 decodes the moving image signal corresponding to "a" of the "a, b, c and d" pixel unit in FIG. 7 by the 4T periods by adding the output signals from the dual port memories 143 to 145 based on the equation (5). The decoding unit 150 outputs the decoded signal to the synthesizer 155 at the timing of the system signal $\phi_1$. The decoding unit 151 decodes the moving image signal corresponding to "b" of the pixel unit by the 4T periods by subtracting the output from the dual port memory 145 from the sum of the outputs from the dual port memories 143 and 144 based on the equation (6). The decoding unit 151 outputs the decoded signal to the synthesizer 155 at the timing of the system signal $\phi_2$.

The decoding unit 152 decodes the moving image signal corresponding to "c" of the pixel unit by the 4T periods by subtracting the output from the dual port memory 144 from the sum of the outputs from the dual port memories 143 and 146 based on the equation (7). The decoding unit 152 outputs the decoded signal to the synthesizer 155 at the timing of the system signal $\phi_3$. The decoding unit 153 decodes the moving image signal corresponding to "d" of the pixel unit by the 4T periods by subtracting the outputs from the dual port memories 144 and 146 from the output from the dual port memory 143 based on the equation (8). The decoding unit 153 outputs the decoded signal to the synthesizer 155 at the timing of the system signal $\phi_4$.

The synthesizer 155 synthesizes the moving image signals outputted from the decoding units 150 to 153 respectively corresponding to "a", "b", "c" and "d" of the pixel unit at the timings of the system signals $\phi_1$ to $\phi_4$ into one moving image signal. The signal outputted from the synthesizer 155 is converted by the D/A converter 156 into a predetermined analog video signal and outputted to the display 123.

In a case where the number of the partial moving image signals inputted to the decoder 121 is three, the controller 120 prohibits read-out operation from the dual port memory 146 and controls the connector 148 to output pseudo data to render the value of $k_{22}$ in the equations (7) and (8) "0". For this purpose, the controller 120 controls the dual port memory 146 not to perform reading operation and controls the connector 148 to output "0" data. The operations of the other components are similar to those in the above case where the number of the partial moving image signals is four. In this case, the $k_{22}$ value is replaced by "0" in the decoding units 152 and 153 and decoded moving image signals are outputted.

If the number of partial moving image signals arrived at the decoder 121 is two, reading operations from the dual port memories 145 and 146 are prohibited, and pseudo data is outputted so as to render $k_{21}$ and $k_{22}$ of the equations (5) to (8) "0". Accordingly, decoding is performed as $k_{21}=k_{22}=0$ in the decoding units 150 to 153 and decoded signals are outputted.

On the other hand, if the number of the partial moving image signals arrived at the decoder 121 is only one, reading operations from the dual port memories 144 to 146 are prohibited, and pseudo data is outputted so as to render $k_{11}$, $k_{21}$ and $k_{22}$ values "0". In the decoding units 150 to 153, decoding is performed as $k_{11}=k_{21}=k_{22}=0$ and the decoded signals are outputted.

As described above, according to the present embodiment, coding/decoding of moving image data is performed in accordance with transmission load information of moving image data between the terminals connected to the moving image network system, and transmission data amount can be adjusted based on the transmission load between the terminals which have issued a transmission request, which reduces status of waiting for response to transmission request and raises responsiveness to transmission request.

It should be noted that the division of a moving image signal into pixel units is not limited to that shown in FIG. 7. For example, division may be made as shown in FIG. 9.

Figure 9:
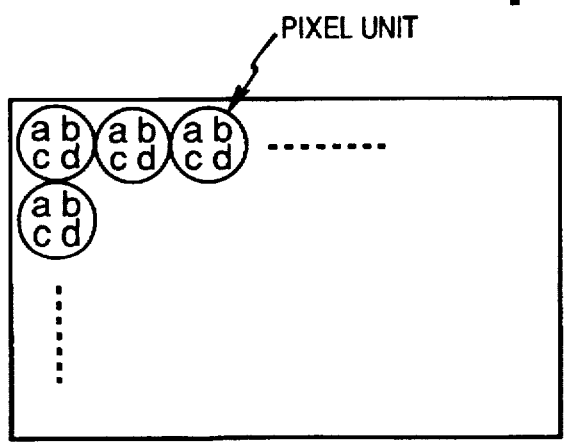
FIG. 9 illustrates another example of pixel units divided from an moving image signal.

In this case, only the value of $k_{01}$ in the equation (1) obtained by the division in FIG. 9 is transmitted and the decoder 121 performs publicly-known processings such as zero-interpolation, low-frequency cut-off processing, resampling for image reduction to reproduce an excellent ½×½ sized moving image. If a receiver terminal does not need an original-sized moving image output, processing load in relaying by each terminal and waiting status can be reduced.

Further, in the present embodiment, the encoding units 152 and 153 shown in FIG. 6 are corresponding to high-frequency image component. If an input moving image signal does not include much high components, transfer of the outputs from the encoding units 152 and 153 to the moving image data transmitter 119 may be omitted, thus reducing the processing load upon relaying operation at each terminal and transmission waiting status.

|Modification|

Figure 12:
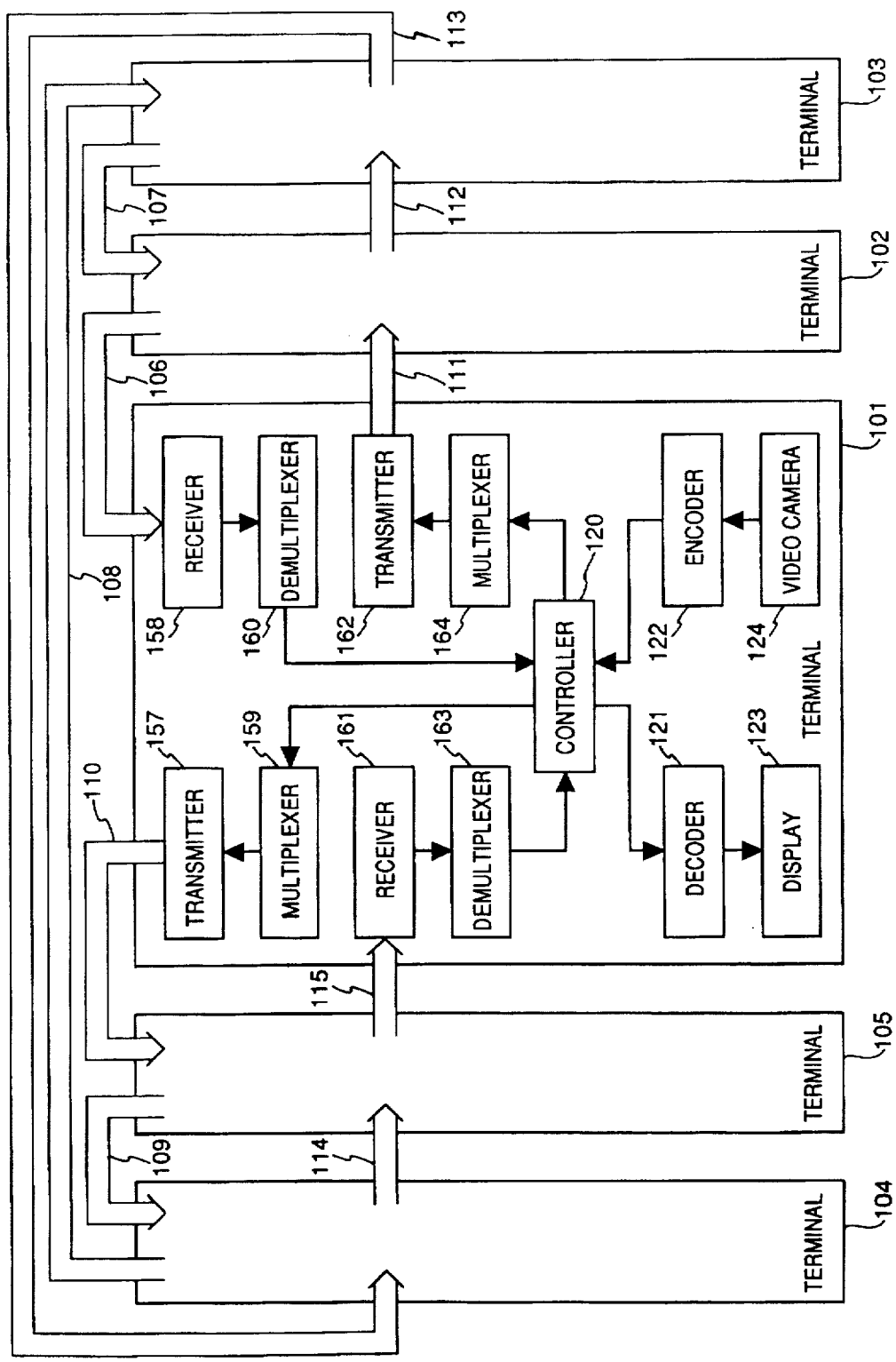
FIG. 12 is a block diagram showing the configuration of a moving image network system according to a modification to the third embodiment.

FIG. 12 is a block diagram showing the configuration of a moving image network system according to a modification of the third embodiment. The system is constructed for multiplexing moving image data and transmission load information, and transmitting the multiplexed data. In this construction, the components corresponding to those in the moving image network system in the third embodiment have the same reference numerals and the explanations of these components will be omitted.

In FIG. 12, reference numeral 157 denotes a transmitter for transmitting moving image data to be transmitted in a descending order (terminal 101→terminal 105→terminal 104→terminal 103→terminal 102→terminal 101) and transmission load information from transmitter 162, i.e., transmission load information regarding moving image data transmitted in an ascending order; 158, a receiver for receiving moving image data and transmission load information transmitted in the descending order; and 159, a multiplexer for multiplexing the moving image data and transmission load information to be transmitted in the descending order.

Figure 11:
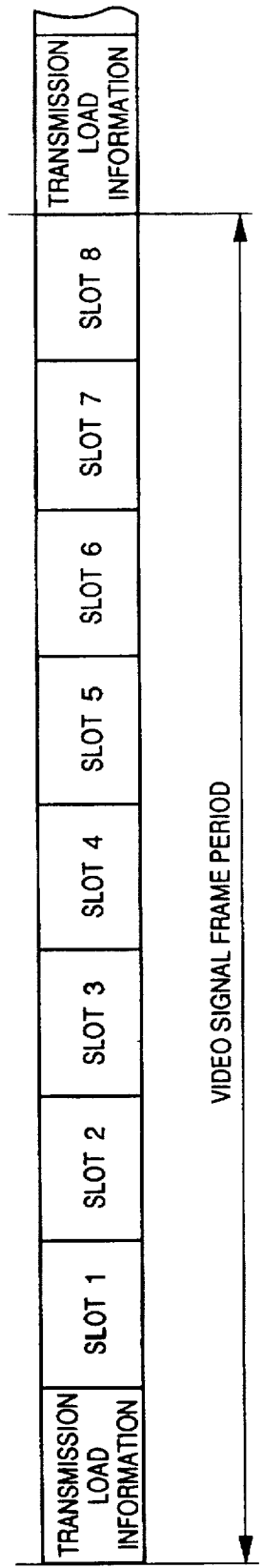
FIG. 11 illustrates multiplexed moving image data and transmission load information transmitted in descending order by multiplexer 159.

In FIG. 11, slots 1 to 8 are slots for transmitting the respective moving image data. As described above, in this modification, four slots are employed for high-precision transmission of moving image data. Accordingly, using eight slots enables high-precision transmission of two moving image data. In FIG. 11, transmission load information is also transmitted in a time-divisional manner corresponding to the slots.

Numeral 160 denotes a demultiplexer for demultiplexing the moving image data and transmission load information received by the receiver 158. Numeral 162 denotes a transmitter for transmitting moving image data to be transmitted in the ascending order (terminal 101→terminal 102→terminal 103→terminal 104→terminal 105→terminal 101) and transmission load information from the transmitter 157, i.e., transmission load information regarding the moving image data transmitted in the descending order. Numerals 161, 163 and 164 respectively denote a receiver, a demultiplexer and a multiplexer, for moving image data and transmission load information transmitted in the ascending order, having similar functions of the receiver 158, the demultiplexer 160 and the multiplexer 159 for the data transmitted in the descending-order.

In this modification, each terminal selects a transmission order of lower transmission load by examining transmission load information of the ascending order and that of the descending order at starting of moving image transmission. In case of ascending-order transmission, the transmission terminal receives transmission load information transmitted in the descending order via the demultiplexer 160 and examines the transmission load to control the encoder 122. In case of descending-order transmission, the terminal examines the transmission load information via the demultiplexer 163 to control the encoder 122.

It should be noted that this modification provides a double-ring topology in which the terminals 101 and 105 are connected, however, a double-bus topology in which the terminals 101 and 105 are not connected is also applicable.

[Fourth Embodiment]

Figure 13:
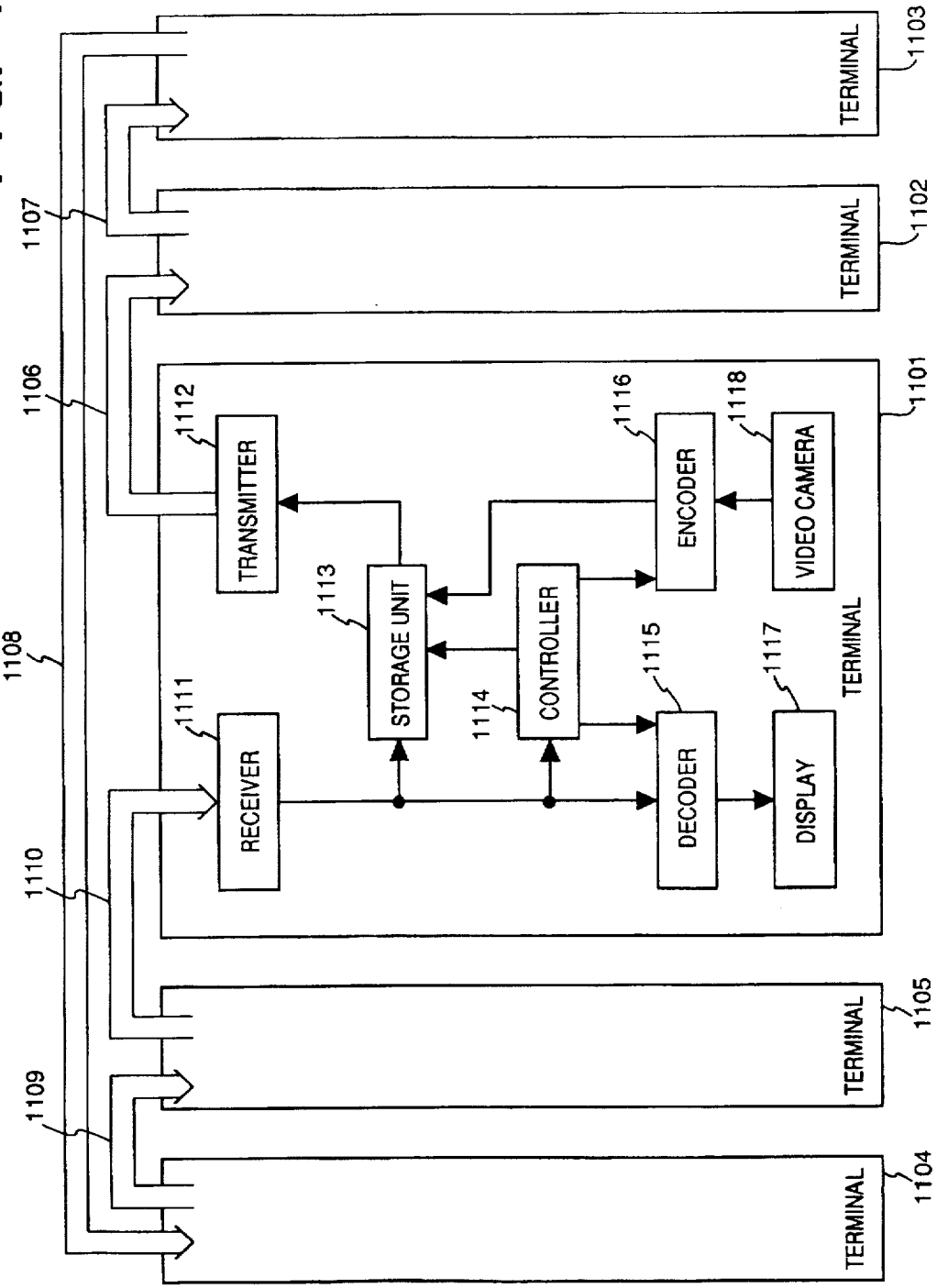
FIG. 13 is a block diagram showing the configuration of a moving image network system according to a fourth embodiment of the present invention.

FIG. 13 is a block diagram showing the configuration of a moving image network system according to the fourth embodiment of the present invention. In this embodiment, different from the foregoing modification, control is made based on allowable delay time. In FIG. 13, the moving image network system also comprises five terminals 1101 to 1105. As these terminals has the same construction, FIG. 13 shows only the construction of the terminal 1101.

Numerals 1106 to 1110 denote coaxial cables which function as transmission paths connecting the respective terminals; 1111, a receiver for receiving data transmitted on the coaxial cable; 1112, a transmitter for transmitting data onto the coaxial cable.

Figure 14:
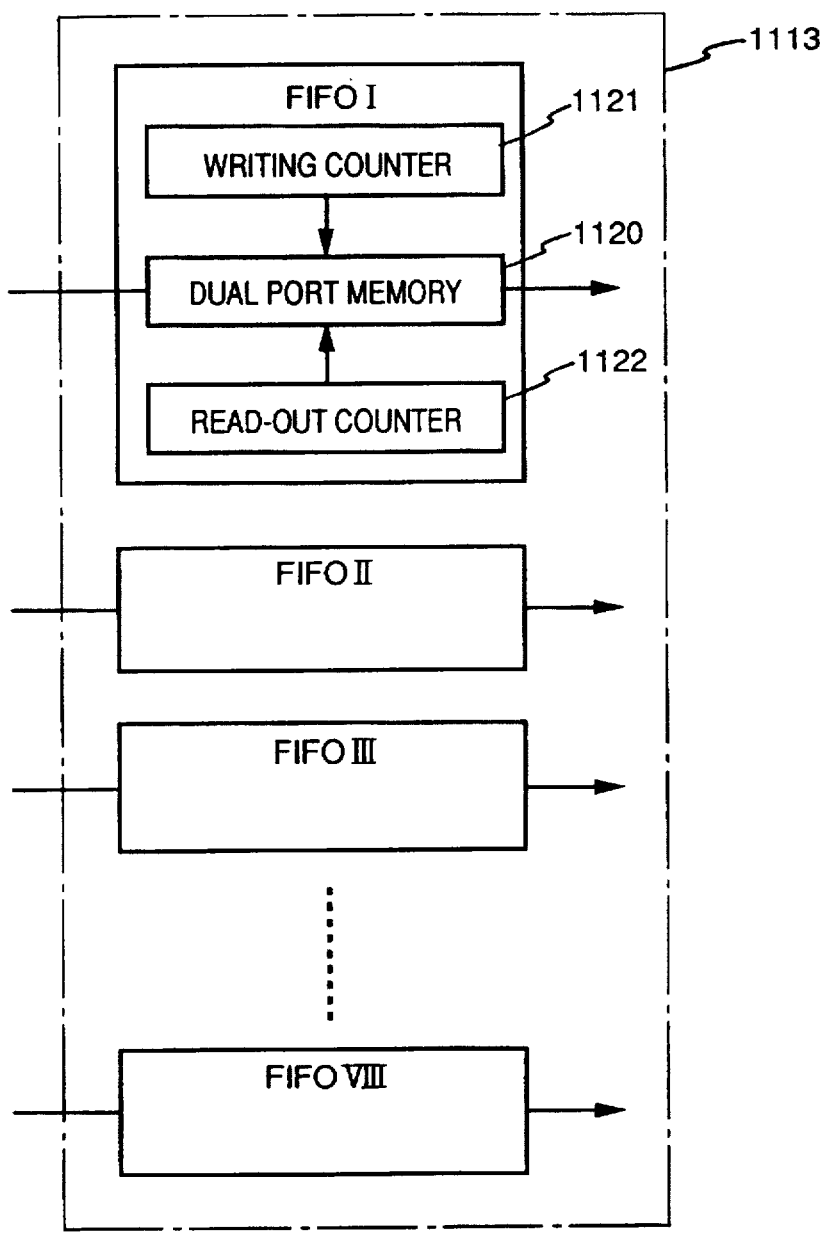
FIG. 14 is a block diagram showing the construction of memory 1113 of the moving image network system in the fourth embodiment.

Numeral 1113 denotes a storage unit comprising a plurality of FIFO memories for temporarily storing transmission data from data from the coaxial cable, in priority order, including data for the terminal 1101 and data to be transmitted from the terminal 1101 to the another terminal. FIG. 14 shows the construction of the storage unit 1113.

Numeral 1114 denotes a controller for examining a receiver terminal number, priority, a coding type, allowable delay time and the like indicated by a header added to the head of a partial moving image packet outputted from the receiver 1111. If the receiver terminal number coincides with the number of the terminal 1101, the controller 1114 inputs the partial moving image packet signal outputted from the receiver 1111 into decoder 1115.

If the receiver terminal number does not coincide with the number of the terminal 1101, the controller 1114 writes the data into a predetermined FIFO memory of the storage unit 1113 in accordance with the priority of the data, and writes the priority of the partial moving image packet signal and allowable delay time into a management table. Further, the controller 1114 searches the management table to read out the partial moving image packets which have been stored within the allowable delay time in accordance with priority order and outputs the read data to transmitter 1112.

The decoder 1115 decodes a single or plurality of partial moving image packet signals which arrived at the terminal and outputs the decoded signals as predetermined analog video signals. As the decoder 1115 has a construction similar to that of the decoder 121 in the third embodiment as shown in FIG. 6, the illustration and description of the construction of the decoder 1115 will be omitted.

Numeral 1117 denotes a display which functions as a moving image output device. The display 1117 displays a moving image by the analog video signal outputted from the decoder 1115. Numeral 1116 denotes an encoder for converting the analog video signal outputted from video camera 1118 as a moving image information source into four partial moving image data in accordance with the predetermined conversion method shown in the third embodiment, adding a predetermined header to the respective data, further, arranging the data as packet data and outputting the packet data to the storage unit 1113.

As the encoder 1116 has a construction similar to that of the encoder 122 in the third embodiment as shown in FIG. 5, the illustration and description of the construction of the encoder 1116 will be omitted. Further, division of moving image signal in pixel units is made in a manner similar to that in the third embodiment (FIG. 7) and therefore the illustration of the division will be omitted.

FIG. 14 is a block diagram showing in detail the construction of the storage unit 1113 of the moving image network system in the present embodiment. The storage unit 1113 comprises eight FIFO memories I to VIII. Though FIG. 14 shows only the construction of the FIFO I, each FIFO has dual port memory 1120 for independently performing writing and reading out, writing counter 1121 for generating a writing address and read-out counter 1122 for generating a read-out address.

The operation of the moving image network system according to the fourth embodiment of the present invention will be described below. The operations of each terminal of the moving image network system are divided into the following three operations, and each terminal performs one of these necessary operations. However, these operations are similar to those in the third embodiment, and therefore, operations characteristic to the present embodiment will be mainly described.

In this system, each terminal performs one of the following three necessary operations;

(1) coding: dividing a transmission moving image signal into partial moving image signals and encoding the partial moving image signals.

(2) relaying: transmitting partial moving image data signal received from a transmission path and partial moving image data generated by the terminal itself onto the transmission path in accordance with a predetermined procedure.

(3) decoding: decoding received partial to the terminal itself moving image signals.

<Encoding Operation>

When a moving image signal is inputted from the video camera 1118 into the encoder 1116, the system clock generator 129 of the encoder 1116 separates horizontal and vertical synchronous signals from the moving image signal. The sampling timings of the present embodiment are the same as those as shown in FIG. 8 (the sampling signals $\phi_1$ to $\phi_4$ quadruply interleaved at the period 4T which is a quadruple of the pixel period of an input moving image signal). The moving image signal inputted from the video camera 1118 is sampled in the pixel units "a, b, c and d" (FIG. 7) and A/D-converted by the A/D converters 125 to 128. Clock $\phi_0$ latches the A/D converters 125 to 128 so as to simultaneously output the converted data to the encoding units 131 to 134 via the connector 130.

The operation of the encoding units is similar to that of those in the third embodiment and therefore the explanation of the operation will be omitted.

The read-out counter 140 generates a read-out address at a predetermined transmission timing and outputs the address to the dual port memories 136 to 139. A partial moving image signal is sequentially read out of the dual port memory 136 as a serial signal and outputted to the header adder 141.

The header adder 141 adds header information including a receiver terminal address, the address of the terminal 1101 as a transmitter terminal address, coding type "A", priority "1", the transmission time as coding time and allowable delay time 4 ms to the output from the dual port memory 136, and writes the data into the FIFO V of the storage unit 1113. This allowable delay time is a time range that a viewer of the moving image does not feel anxiety upon transmission of moving image data. Similarly, the header adder 141 adds header information including the same transmitter and receiver terminal addresses, coding type "B" and priority "2", same transmission time and allowable delay time to the output from the dual port memory 137 and outputs the data to the FIFO VI of the storage unit 1113.

The header adder 141 adds header information including the same transmitter and receiver terminal addresses, coding type "C" and priority "3", the same transmission time and allowable delay time to the output from the dual port memory 138 and outputs the data to the FIFO VII of the storage unit 1113. Further, the header adder 141 adds header information including the same transmitter and receiver terminal addresses, coding type "D" and priority "4", the same transmission time and allowable delay time to the output from the dual port memory 139 and outputs the data to the FIFO VIII of the storage unit 1113.

The data written into the FIFO's V to VIII are processed in relaying operations to be described below.

<Relaying Operation>

A partial moving image signal data transmitted from another terminal (e.g., the terminal 1105) to the terminal 1101 is received by the receiver 1111 via the transmission path 1110. The controller 1114 examines the header information of the data and sets the output destination of the data. If the receiver terminal address coincides with the terminal 1101, the output of the receiver 1111 is transferred to the decoder 1115. However, if the receiver terminal address does not coincide with the address of the terminal 1101, the controller 1114 examines the priority information. If the priority is "1", the data is outputted to the dual port memory 1120 of the FIFO I in the storage unit 1113.

Similarly, if the priority is "2", the data is outputted to the dual port memory 1120 of the FIFO II; if the priority is "3", the data is outputted to the dual port memory 1120 of the FIFO III; and if the priority is "4", the data is outputted to the dual port memory 1120 of the FIFO IV. The partial moving image signal to the storage unit 1113 is sequentially written into a predetermined area in accordance with a writing address outputted from the writing counter 1121. At this time, the controller 1114 registers a writing start address and a writing end address, and the transmission time and the allowable delay time added to the header information into the management table.

In this manner, the partial moving image signal received by the receiver 1111 is written into the FIFO I to IV, and as described above, the partial moving image signal to be transmitted from the terminal 1101 is written into the FIFO V to FIFO VIII.

The controller 1114 examines presence/absence of untransmitted partial moving image data in the FIFO's by comparing the reading count value and the writing count value of the respective FIFO's. If there is untransmitted partial moving image data, the controller 1114 examines the transmission time and allowable delay time of the data from the management table. If a value obtained by adding the transmission time and the allowable delay time reaches over current time, the controller regards the transmission data as "valid data", outputs a reading address from the read-out counter 1122 to read the data out of the dual port memory 1120, and outputs the read data to the transmitter 1112. The transmitter 1112 converts the received data to a predetermined digital signal and transmits the signal onto the transmission path 1106.

On the other hand, if the value obtained by adding the transmission time and the allowable delay time does not reach the current time, the controller 1114 regards the data "invalid" and cuts the data by setting the read-out count value to the writing start address of the subsequent partial moving image signal.

When there is no untransmitted partial moving image data signal in the FIFO I for the highest priority data, the controller 1114 transmits untransmitted data stored in the FIFO II in a similar manner to that of the transmission of the FIFO I. If a partial moving image signal is newly written into the FIFO I during the transmission of data in the FIFO II, the controller 1114 transmits the partial moving image data signal in the FIFO I after the transmission of the data in the FIFO II.

In this manner, transmission of partial moving image signal is started from higher priority data, and lower priority data is transmitted during/after the transmission of the higher priority data.

<Decoding Operation>

When the partial moving image data signal is inputted into the decoder 1115, the header remover 142 removes the header of the data. If the coding type registered in the header is "A", the signal is written into the dual port memory 143 for the coding type "A" in accordance with a writing address outputted from the writing counter 147. If the coding type is any of "B", "C" and "D", the signal is written into a corresponding one of the dual port memory 144 for coding type "B", the dual port memory 145 for coding type "C" and the dual port memory 146 for coding type "D" in accordance with a writing address from the writing counter 147.

The partial moving image data signal from a transmitter terminal is relayed by the terminal between the transmitter and receiver terminals to the receiver terminal. During the transmission, if the transmission load becomes large and the transmission delay exceeds the allowable delay time, the transmission comes into a waiting status and the partial moving image signal is deleted as described above. For this reason, all the four partial moving image data signals do not always arrive at the receiver 1111. That is, the operation of the decoder 1115 changes in accordance with the number of the arrived partial moving image signals.

As the processings by the controller 1114 based on the number of partial moving image signals are similar to those in the third embodiment, the explanation of these processings will be omitted. It should be noted that in this embodiment, if the decoder 1115 receives no partial moving image data signal, the decoder 1115 reproduces a moving image signal using the partial moving image signal of a previous processing that remains in the dual port memory and outputs the reproduced signal.

As described above, according to the present embodiment, transmitting moving image data signals on the moving image network system in accordance with priority order so as to reduce delay time, and removing image data which is delayed over the allowable delay time to efficiently use the transmission paths, reduces status of waiting for response to transmission request, raises the response and prevents halt of moving image signal.

Similarly to the third embodiment, the division of a moving image signal in pixel units is not limited to that as shown in FIG. 7, and the division as shown in FIG. 9 is applicable.

Further, similarly to the third embodiment, the encoding units 133 and 134 are corresponding to high-frequency image component. In case where an input moving image signal does not include much high-frequency component, the outputs from the encoding units 133 and 134 may be stopped to reduce transmission load in relaying processing at each terminal and transmission-waiting status.

In this embodiment, the coding is not limited to the above method. A hierarchical coding scheme, e.g., DCT hierarchical coding can be employed. Such hierarchical coding as a modification will be described below.

[Modification]

Figure 15:
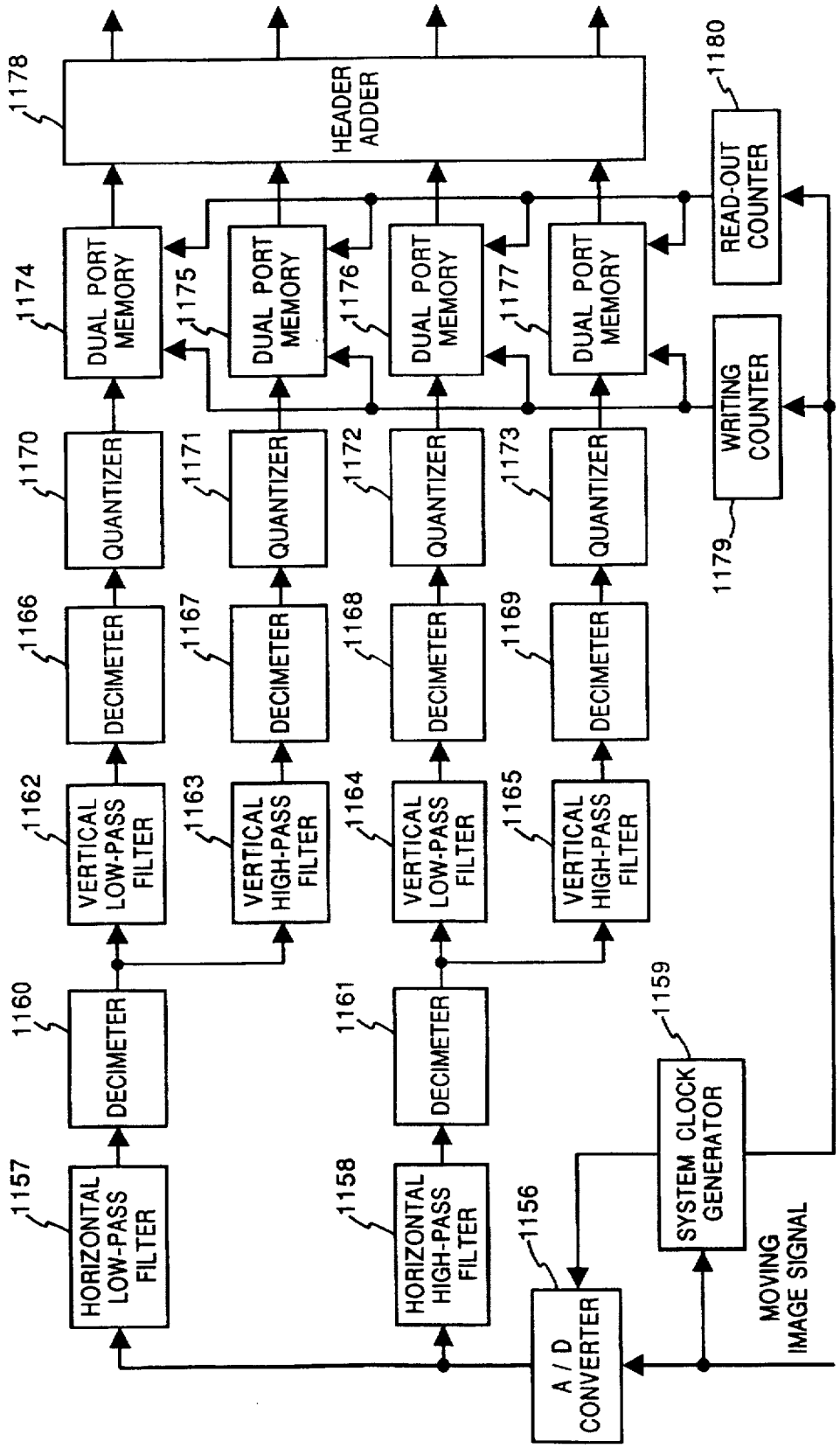
FIG. 15 is a block diagram showing a modification to an encoder of the moving image network system in the fourth embodiment.

FIG. 15 is a block diagram showing a modification to the construction of the encoder of the moving image network system in the fourth embodiment. The encoder of FIG. 15 performs sub-band coding by filter construction. Reference numeral 1156 denotes an A/D converter for digitizing a moving image signal outputted from the video camera 1118; 1157, a horizontal low-pass filter for passing only low-frequency component in a horizontal direction of the video image; and 1158, a horizontal high-pass filter for passing only high-frequency component in the horizontal direction of the video image.

Numeral 1159 denotes a system clock generator for extracting a synchronous signal from the moving image signal outputted from the video camera 1118 and generating sampling signals and various timing signals used within the terminal; 1160 and 1161, decimeters for thinning the number of pixels in the horizontal direction by half.

Numerals 1162 and 1164 denote vertical low-pass filters for passing only low-frequency component in a vertical direction of the video image; and 1163 and 1165, vertical high-pass filters for passing only high-frequency component in the vertical direction of the video image.

Numerals 1166 to 1169 denote decimeters for thinning the number of pixels in a vertical direction by half; 1170 to 1173, quantizers for compressing the outputs from the decimeters 1166 to 1169 to a predetermined bit length; 1174 to 1177, dual port memories; 1178, a header adder; 1179, a writing counter; and 1180, a read-out counter. Note that the dual port memories and the counters respectively correspond to the dual port memories and the counters in the third embodiment (FIG. 5).

In this modification, when the moving image signal from the video camera 1118 enters the encoder, a sampling signal having the same period as the pixel period T is generated. More specifically, the A/D converter 1156 A/D-converts the moving image signal by the sampling clock outputted from the system clock generator 1159 and outputs the converted signal to the horizontal low-pass filter 1157 and the horizontal high-pass filter 1158.

The horizontal low-pass filter 1157 removes high-frequency component in the horizontal direction of the signal. The decimeter 1160 thins the number of pixels by half in the horizontal direction.

The vertical low-pass filter 1162 removes high-frequency component of the output from the decimeter 1160. The decimeter 1166 thins the number of pixels by half in the vertical direction. Thereafter, the quantizer 1170 compresses the data to a predetermined bit length. The quantizer 1170 outputs a partial moving image signal which includes only low-frequency component in both the horizontal and vertical directions to the dual port memory 1174.

The output from the decimeter 1160 is also provided to the vertical high-pass filter 1163 which removes low-frequency component in the vertical direction. The decimeter 1167 thins the number of pixels by half in the vertical direction, and the quantizer 1171 compresses the data to a predetermined bit length. The quantizer 1171 outputs a partial moving image signal which includes low-frequency component in the horizontal direction and high-frequency component in the vertical direction to the dual port memory 1175.

The moving image signal including high-frequency component in the horizontal direction outputted from the decimeter 1161 enters the vertical low-pass filter 1164 which removes high-frequency component in the vertical direction. The decimeter 1168 thins the number of pixels by half in the vertical direction. The quantizer 1172 compresses the data into a predetermined bit length, and outputs a partial moving image signal including high-frequency component in the horizontal direction and low-frequency component in the vertical direction to the dual port memory 1176.

The output from the decimeter 1161 is also provided to the vertical high-pass filter 1165 which removes low-frequency component in the vertical direction. The decimeter 1169 thins the number of pixels by half in the vertical direction, and the quantizer 1173 compresses the data to a predetermined bit length. The quantizer 1173 outputs a partial moving image signal including only high-frequency component in both the horizontal and vertical directions to the dual port memory 1177.

The four partial moving image signals outputted to the dual port memories 1174 to 1177 are respectively read out from the dual port memories. The header adder 1178 adds a header to the respective signals and outputs the data to the storage unit 1113.

Figure 16:
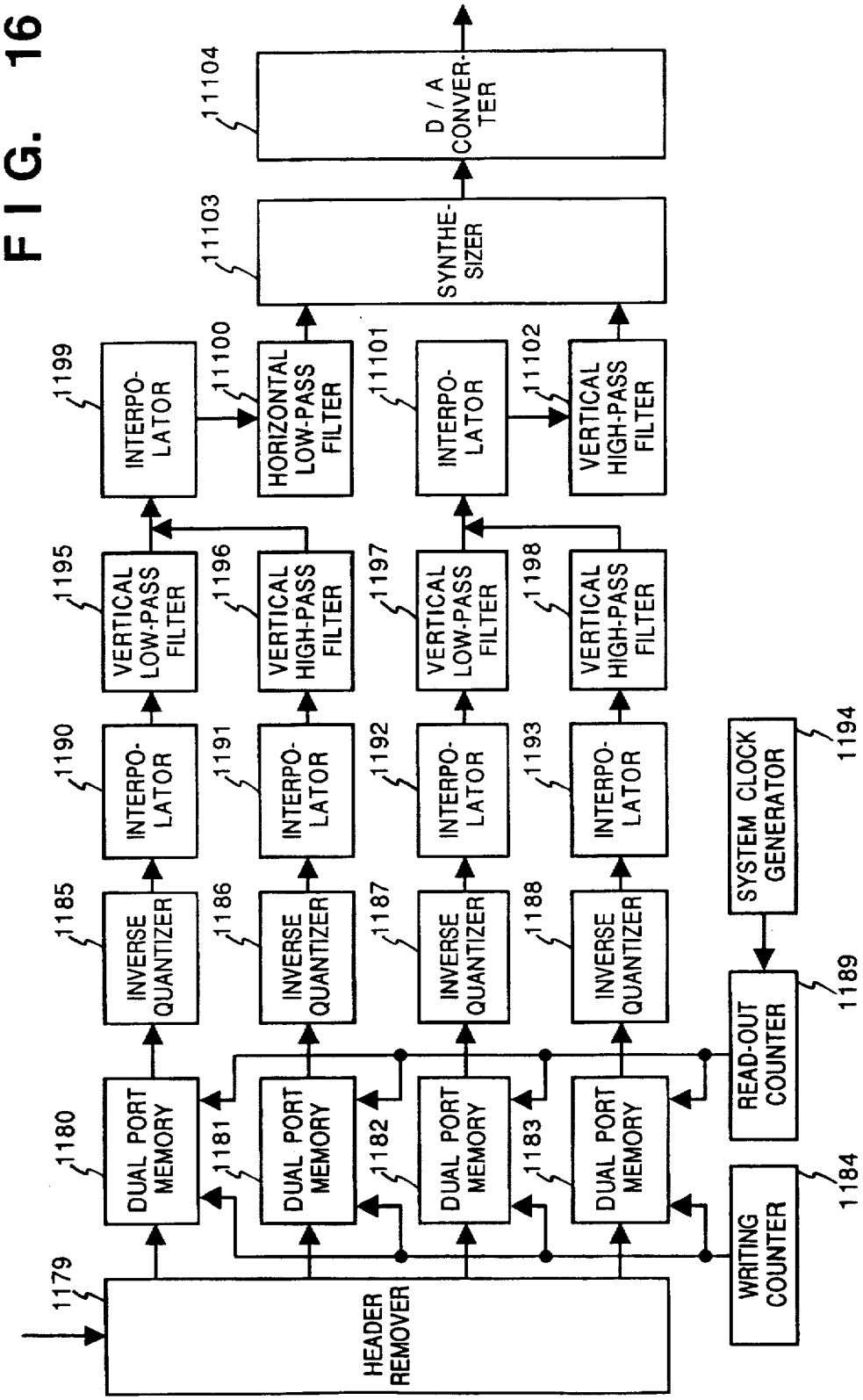
FIG. 16 is a block diagram showing the construction of a decoder in the modification to the encoder in FIG. 15.
Figure 17:
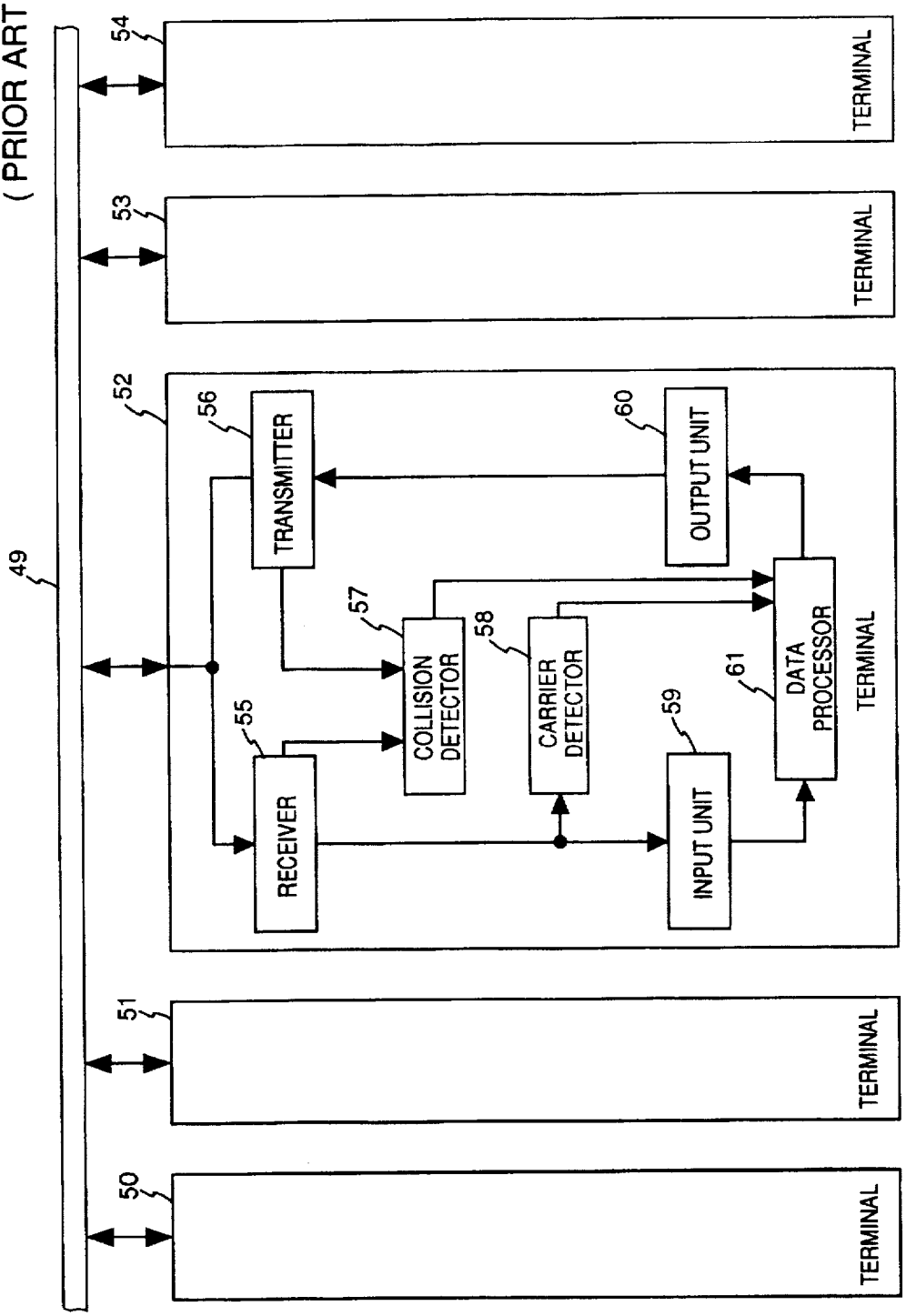
FIG. 17 is a block diagram showing the configuration of the conventional information network system.
Figure 18:
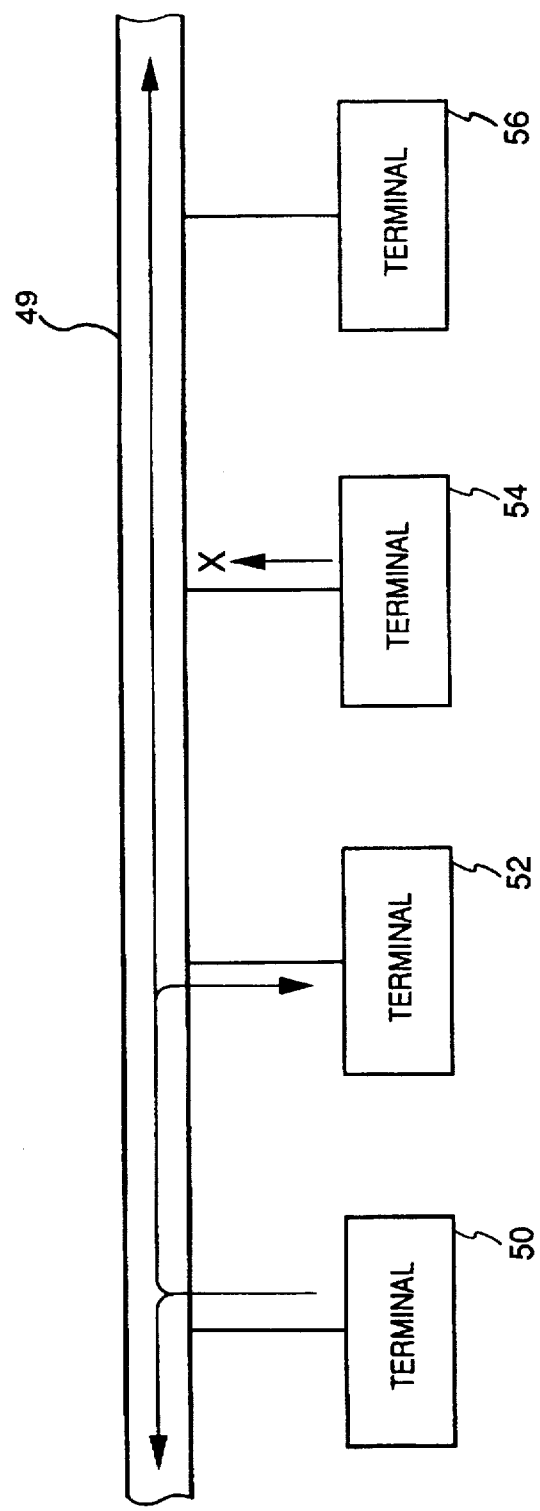
FIG. 18 is a block diagram for explaining the problems of the conventional information network system.
Figure 19:
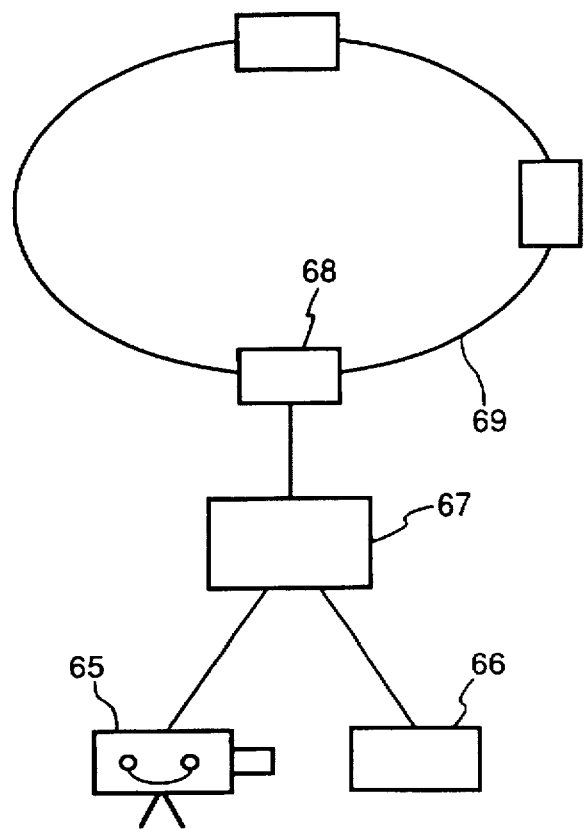
FIG. 19 is a block diagram showing the configuration of the conventional moving image network as an optical ring network.

FIG. 16 is a block diagram showing the construction of the decoder of this modification. In FIG. 16, reference numeral 1179 denotes a header remover; 1180 to 1183, dual port memories; 1184, a writing counter; 1189, a read-out counter; and 1194, a system clock generator. Note that the dual port memories, counters and the system clock generator have the same functions as those of the encoder in the third embodiment (FIG. 16).

Numeral 1185 to 1888 denote inverse quantizers for expanding the bit length data compressed by the quantizers of the encoder to a predetermined length data; 1190 to 1193, interpolators for interpolating the pixels to a doubled number; 1195 and 1197, vertical low-pass filters for passing only low-frequency component in the vertical direction; and 1196 and 1198, vertical high-pas filters for passing only high-frequency component in the vertical direction.

Numerals 1199 and 11101 denote interpolators for interpolating the number of pixels to a doubled number in the horizontal direction; 11100, a horizontal low-pass filters for passing only low-frequency component in the horizontal direction; 11102, a horizontal high-pass filter for passing only high-frequency component in the horizontal direction; 11103, a signal synthesizer; and 11104, a D/A converter.

The partial moving image data signals arrived at the decoder 1115 are written into the dual port memories 1180 to 1183 respectively in accordance with a coding type registered in the header, and sequentially outputted in accordance with a read-out address outputted from the read-out counter 1189. If the number of partial moving image data signals arrived at the decoder 1115 is four, all the outputs from the dual port memories 1180 to 1183 are used for decoding.

The output from the dual port memory 1180 is a partial moving image signal including only low-frequency component in both the horizontal and vertical directions. The inverse quantizer 1185 expands the signal into a predetermined bit length and the interpolator 1190 interpolates the pixels to a doubled number. The vertical low-pass filter 1195 removes high-frequency noise component occurred in the interpolation and outputs the data to the interpolator 1199.

The output from the dual port memory 1181 is a partial moving image signal including low-frequency component in the horizontal direction and high-frequency component in the vertical direction. The inverse quantizer 1186 expands the signal to a predetermined bit length and the interpolator 1191 interpolates the pixels to a doubled number in the vertical direction. The vertical high-pass filter 1196 removes low-frequency noise component occurred in the interpolation and outputs the data to the interpolator 1199.

The interpolator 1199 interpolators the pixels to a doubled number in the horizontal direction, and the horizontal low-pass filter 11100 removes low-frequency noise component in the horizontal direction occurred in the interpolation and outputs the data to the synthesizer 11103.

The output from the dual port memory 1182 is a partial image signal including high-frequency component in the horizontal direction and low-frequency component in the vertical direction. The inverse quantizer 1187 expands the signal to a predetermined bit length, and the interpolator 1192 interpolates the pixels to a doubled number in the vertical direction. The vertical low-pass filter 1197 removes high-frequency noise component in the vertical direction occurred in the interpolation and outputs the data to the interpolator 11101.

The output from the dual port memory 1183 is a partial moving image signal including only high-frequency component in both the horizontal and vertical directions. The interpolator 1193 interpolates the pixels to a doubled number in the vertical direction. The vertical high-pass filter 1198 removes low-frequency noise component occurred in the interpolation and outputs the data to the interpolator 11101.

The interpolator 11101 interpolates the pixels to a doubled number in the horizontal direction, and the horizontal high-pass filter 11102 removes low-frequency component noise in the horizontal direction and outputs the data to the synthesizer 11103. The synthesizer 11103 combines the signal which lacks high-frequency component in the horizontal direction outputted from the horizontal low-pass filter 11100 and the signal which lacks low-frequency component in the horizontal direction outputted from the horizontal high-pass filter 11102 to reproduce the original moving image signal and outputs the signal to the D/A converter 11104. The D/A converter 11104 converts the moving image signal to a predetermined analog video signal and outputs the signal to the display 1117.

If the number of the partial moving image data signals arrived at the decoder 1115 is less than four, similarly to the third embodiment, the dual port memory corresponding to the non-arrived partial moving image signal outputs a pseudo signal having a value "0" for decoding.

As described above, according to the modification, control of the relaying or deletion of moving image data based on priority order in accordance with transmission load of moving image data enables transmission band assignment corresponding to the transmission load of the transmission path of the terminal that has issued a moving image data transmission request, which reduces status of waiting for response to transmission request and raises the response.

Further, coding/decoding moving image data based on priority of the moving image data and its allowable transmission delay time raises usage efficiency of transmission paths, reduces status of waiting for a response to transmission request and improves the response.

The present invention can be applied to a system constituted by a plurality of devices, or to an apparatus comprising a simple device. Furthermore, it goes without saying that the invention is applicable also to a case where the object of the invention is attained by supplying a program to a system or apparatus.

The present invention is not limited to the above embodiments and various changes and modifications can be made within the spirit and scope of the present invention. Therefore, to apprise the public of the scope of the present invention, the following claims are made.

What is claimed is:

1. A moving image network system, in which a plurality of terminals are connected to each other via a transmission path having a plurality of channels over which information can be transmitted in first and second opposite directions, for transmitting/receiving moving image data inserted into one or more of the channels, each terminal comprising:

generating means for generating first load information indicative of a transmission load for first moving image data, the first load information indicating a transmission priority order of the first moving image data;

transmitting/receiving means for transmitting/receiving the first load information over the transmission path in the first direction;

coding means for encoding the first moving image data based on a lossy compression coding method selected in accordance with the first load information; and decoding means for decoding received coded second moving image data based on a decoding method selected in accordance with second load information received by said transmitting/receiving means, the second load information having been transmitted in the second direction.

2. The system according to claim 1, wherein each of the first and second load information includes at least one of information specifying a transmitter terminal of the respective moving image data, information specifying a receiver terminal of the respective moving image data, a transmission priority of the respective moving image data and a coding type of the respective moving image data.

3. The system according to claim 1, wherein said coding means selects the coding method in accordance with a number of the channels of the transmission path into which the first moving image data is to be inserted.

4. The system according to claim 1, wherein, if there is no empty channel in the transmission path and at least one of the channels contains other moving image data having a priority lower than that of the first moving image data and lower than a predetermined priority, said coding means deletes the other moving image data and inserts the first moving image data in place of the deleted data.

5. The system according to claim 2, wherein said decoding means changes its decoding operation in accordance with the coding type of the second load information.

6. The system according to claim 1, wherein the first moving image data is provided in a plurality of pixel units, each pixel unit having N (N is an integer) pixels, and said coding means repeatedly divides each pixel unit into two pixel groups until a number of pixels belonging to each pixel group is one and encodes the first moving image data using N coding conversion values obtained from 2N−1 average values with respect to an image signal corresponding to each pixel unit.

7. A moving image terminal connected to another terminal via a transmission path, for transmitting/receiving moving image data, comprising:

storage means for storing moving image data;

generating means for generating management information for the moving image data, the management information including timing data for reproducing the moving image data; and coding means for encoding the moving image data based on a coding method selected in accordance with the management information.

8. The terminal according to claim 7, further comprising decoding means for decoding received coded moving image data based on a decoding conversion method selected in accordance with received management information for the received coded moving image data.

9. The terminal according to claim 7, wherein the management information further includes at least one of information specifying a transmission terminal of the moving image data, information specifying a reception terminal of the moving image data, a coding type, a start address and an end address for writing the moving image data into said storage means, a transmission start time of the moving image data and an allowable delay time of the moving image data.

10. The moving image terminal according to claim 7, wherein said storage means stores the moving image data into a memory area in accordance with the timing data, and said terminal includes deciding means for deciding, if the moving image data in the memory area has not yet been transmitted, validity of the untransmitted moving image data based on a transmission start time of the moving image data and an allowable delay time of the moving image data.

11. The terminal according to claim 10, wherein if a current time is later than a decision time when the allowable delay time has elapsed after the transmission start time, said deciding means decides that the untransmitted moving image data is valid, and decides that the untransmitted moving image data is invalid and deleted if the current time is before the decision time.

12. The system according to claim 1, wherein the first moving image data is provided in a plurality of pixel units, each pixel unit having N (N is an integer) pixels, and said coding means repeatedly divides each pixel unit into two pixel groups until a number of pixels belonging to each pixel group is one and encodes the first moving image data using N coding conversion values obtained from 2N−1 average values with respect to an image signal corresponding to each pixel unit.

13. An information transmitting apparatus comprising:

first means for generating moving image information to be transmitted;

second means for generating other information that is independent of the moving image information; and transmitting means for transmitting the moving image information and the other information through a network, the moving image information being transmitted prior to the other information based on the other information.

14. An information transmitting apparatus according to claim 13, wherein the moving image information is compressed by a hierarchical compression method.

15. An information transmitting apparatus according to claim 13, wherein said transmitting means transmits lower resolution information of the moving image information prior to transmitting higher resolution information of the moving image information.

* * * * *